(12) United States Patent
Takeda

(10) Patent No.: US 11,027,735 B2
(45) Date of Patent: Jun. 8, 2021

(54) VEHICLE CONTROL APPARATUS, VEHICLE CONTROL METHOD, AND VEHICLE CONTROL PROGRAM

(71) Applicant: HONDA MOTOR CO., LTD., Tokyo (JP)

(72) Inventor: Masanori Takeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 560 days.

(21) Appl. No.: 15/743,317

(22) PCT Filed: Jul. 14, 2016

(86) PCT No.: PCT/JP2016/070865
§ 371 (c)(1),
(2) Date: Jan. 10, 2018

(87) PCT Pub. No.: WO2017/022448
PCT Pub. Date: Feb. 9, 2017

(65) Prior Publication Data
US 2018/0194354 A1 Jul. 12, 2018

(30) Foreign Application Priority Data
Aug. 6, 2015 (JP) .............................. JP2015-156206

(51) Int. Cl.
*B60W 30/18* (2012.01)
*G05D 1/02* (2020.01)
(Continued)

(52) U.S. Cl.
CPC ....... *B60W 30/18163* (2013.01); *B60K 31/00* (2013.01); *B60T 7/12* (2013.01);
(Continued)

(58) Field of Classification Search
None
See application file for complete search history.

(56) References Cited

U.S. PATENT DOCUMENTS 9,381,916 B1* 7/2016 Zhu .................. G01S 17/931
2010/0042282 A1 2/2010 Taguchi et al.
(Continued)

FOREIGN PATENT DOCUMENTS

| CN | 102371995 | 3/2012 |
| CN | 103635947 | 3/2014 |

(Continued)

OTHER PUBLICATIONS

Chinese Office Action and Search Report for Chinese Patent Application No. 201680040577.2 dated Dec. 4, 2019.
(Continued)

*Primary Examiner* — Todd Melton
*Assistant Examiner* — Jason R Roberson
(74) *Attorney, Agent, or Firm* — Amin, Turocy & Watson, LLP

(57) ABSTRACT

A vehicle control apparatus includes: a first detection part that detects a peripheral vehicle which is traveling around a vehicle; a control plan generation part that is configured to generate a control plan of the vehicle according to the peripheral vehicle; and a travel control part that is configured to control acceleration, deceleration, or steering of the vehicle according to the control plan, wherein the control plan generation part generates the control plan of the vehicle according to a peripheral vehicle that satisfies a predetermined condition among one or more peripheral vehicles that are detected by the first detection part, and wherein when it is not possible to detect the peripheral vehicle that satisfies the predetermined condition, the control plan generation part is configured to set a virtual vehicle which virtually simu- (Continued)

lates the peripheral vehicle that satisfies the predetermined condition and generate the control plan of the vehicle.

3 Claims, 23 Drawing Sheets

(51) Int. Cl.
*B60W 30/10* (2006.01)
*B60T 7/12* (2006.01)
*B60W 30/14* (2006.01)
*B60K 31/00* (2006.01)
*G08G 1/16* (2006.01)

(52) U.S. Cl.
CPC ............ *B60W 30/10* (2013.01); *B60W 30/14* (2013.01); *G05D 1/0223* (2013.01); *G05D 1/0253* (2013.01); *G05D 1/0257* (2013.01); *B60T 2201/089* (2013.01); *B60T 2210/36* (2013.01); *B60W 2400/00* (2013.01); *B60W 2420/42* (2013.01); *B60W 2420/52* (2013.01); *B60W 2554/801* (2020.02); *B60W 2556/00* (2020.02); *B60W 2710/20* (2013.01); *B60W 2720/106* (2013.01); *G05D 2201/0213* (2013.01); *G08G 1/167* (2013.01)

(56) References Cited

U.S. PATENT DOCUMENTS

| | | | |
|---|---|---|---|
| 2015/0175158 A1 | 6/2015 | Wagner | |
| 2017/0131401 A1* | 5/2017 | Pascheka | ........ B60W 30/18163 |
| 2018/0354518 A1* | 12/2018 | Inou | ...................... G05D 1/0214 |
| 2019/0071093 A1* | 3/2019 | Ma | ................. B60W 30/18163 |

FOREIGN PATENT DOCUMENTS

| | | | |
|---|---|---|---|
| DE | 102005046841 | | 4/2007 |
| DE | 102013021641 | | 6/2015 |
| JP | 2005-038325 | | 2/2005 |
| JP | 2007-153080 | | 6/2007 |
| JP | 2008-129804 | | 6/2008 |
| JP | 2009-078735 | | 4/2009 |
| JP | 2010-023721 | | 2/2010 |
| JP | 2011-210102 | | 10/2011 |
| JP | 2014-203235 | | 10/2014 |
| JP | 2014203235 A | * | 10/2014 |
| JP | 2015-057688 | | 3/2015 |

OTHER PUBLICATIONS

International Search Report for International Patent Application No. PCT/JP2016/070865 dated Oct. 11, 2016, 5 pages.
German Office Action for German Patent Application No. 112016003572.1 dated Mar. 12, 2021.

* cited by examiner

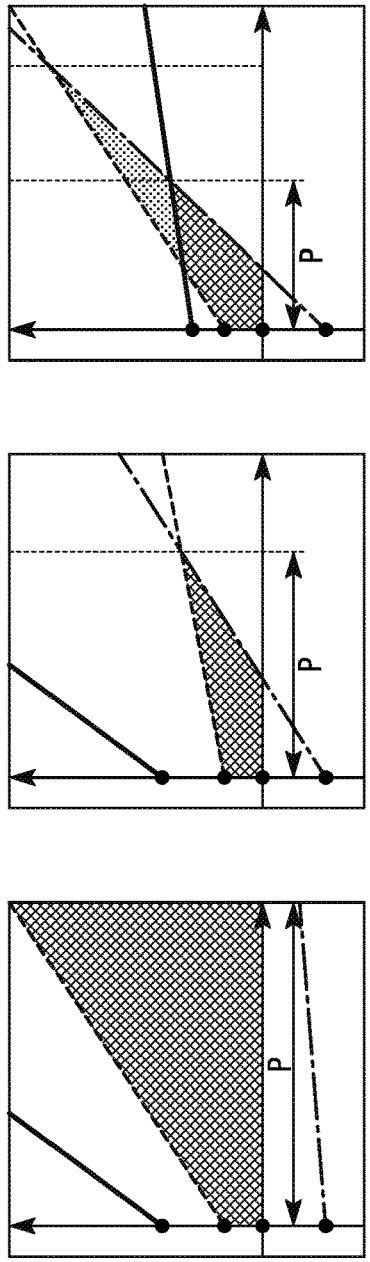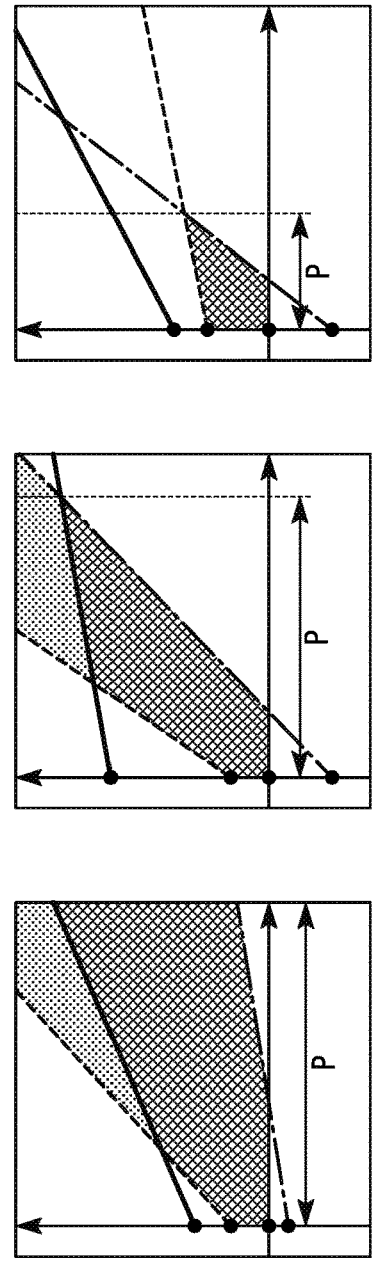
FIG. 14

VEHICLE CONTROL APPARATUS, VEHICLE CONTROL METHOD, AND VEHICLE CONTROL PROGRAM

TECHNICAL FIELD

The present invention relates to a vehicle control apparatus, a vehicle control method, and a vehicle control program.

Priority is claimed on Japanese Patent Application No. 2015-156206, filed on Aug. 6, 2015, the contents of which are incorporated herein by reference.

BACKGROUND

Recently, techniques are desired in which a lane change when traveling is automatically performed depending on a relative relationship between a self-vehicle (hereinafter, also referred to as a first vehicle or simply a vehicle) and a peripheral vehicle. In relation to this, a travel assist apparatus is known which includes an assist start part that starts an assist of a lane change according to an input of an input device, a detection part that detects a relative distance and a relative speed between a self-vehicle (hereinafter, also referred to as a first vehicle or simply a vehicle) and another vehicle (hereinafter, also referred to as a second vehicle or other vehicles), a calculation part that calculates a collision risk degree when the vehicle performs a lane change with respect to another vehicle according to the relative distance and the relative speed detected by the detection part, a first determination part that determines whether or not it is possible to perform a lane change according to the relative distance, the relative speed, and the collision risk degree, a determination part that determines a target space by which a lane change is performed according to the relative distance and the relative speed when the first determination part determines that it is not possible to perform a lane change, a second determination part that determines whether or not there is a space by which a lane change can be performed in the target space, a setting part that sets a target speed toward a lane change waiting position when the second determination part determines that there is not the space and sets a target speed toward a lane change available position when it is determined that there is the space, and a control part that controls the speed of the vehicle so as to be the target speed (for example, refer to Patent Document 1).

Further, in relation to the above technique, a lane change assist apparatus is known which includes a vehicle state detection means, a peripheral vehicle detection means, a lane detection means, a merging end setting means, a peripheral vehicle behavior prediction means, a vehicle operation amount setting means that generates one or more operation amount time series until a vehicle arrives at a merging end, an operation amount determination means that determines whether it is possible to perform an appropriate lane change when performing each operation amount time series generated by the vehicle operation amount setting means and determines by which one of gaps between peripheral vehicles that travel on a lane of a lane change destination it is possible to perform a lane change if it is possible to perform an appropriate lane change, and an assist information presentation means that transmits a correspondence relationship between the gap and the operation of the vehicle obtained by the operation amount determination means to a driver (for example, refer to Patent Document 2).

Related Art Documents

[Patent Document 1] Japanese Unexamined Patent Application, First Publication No. 2009-078735

[Patent Document 2] Japanese Unexamined Patent Application, First Publication No. 2005-038325

SUMMARY OF INVENTION

Problems to be Solved by the Invention

However, in the related art, when a peripheral vehicle is not detected by a detection part such as a radar and a camera, or when the detection accuracy of a peripheral vehicle is low, there may be a case in which it is not possible to perform flexible automated driving.

In view of the foregoing, an object of an aspect of the present invention is to provide a vehicle control apparatus, a vehicle control method, and a vehicle control program capable of performing further flexible automated driving.

Means for Solving the Problem (1) An aspect of the present invention is a vehicle control apparatus which includes: a first detection part that is configured to detect a peripheral vehicle which is traveling around a vehicle; a control plan generation part that is configured to generate a control plan of the vehicle according to the peripheral vehicle which is detected by the first detection part; and a travel control part that is configured to control acceleration, deceleration, or steering of the vehicle according to the control plan which is generated by the control plan generation part, wherein the control plan generation part is configured to generate the control plan of the vehicle according to a peripheral vehicle that satisfies a predetermined condition among one or more peripheral vehicles that are detected by the first detection part, and wherein when it is not possible to detect the peripheral vehicle that satisfies the predetermined condition, the control plan generation part is configured to set a virtual vehicle which virtually simulates the peripheral vehicle that satisfies the predetermined condition and generate the control plan of the vehicle.

(2) In the above aspect (1), when it is not possible to detect the peripheral vehicle that satisfies the predetermined condition, the control plan generation part may set the virtual vehicle in the vicinity of an outer edge of a detection region of the first detection part.

(3) In the above aspect (2), the control plan generation part may set the virtual vehicle as a stationary body in the vicinity of the outer edge of the detection region of the first detection part.

(4) In the above aspect (2), the control plan generation part may set the virtual vehicle as a movable body in the vicinity of the outer edge of the detection region of the first detection part.

(5) In the above aspect (1), the vehicle control apparatus may include a second detection part that detects a disappearance region of a lane or an appearance region of a lane according to one or both of a detection result by the first detection part and map information relating to a lane on which the vehicle can travel, wherein when it is not possible to detect the peripheral vehicle that satisfies the predetermined condition, and when a disappearance region of a lane or an appearance region of a lane is detected in a detection region of the first detection part by the second detection part, the control plan generation part may set the virtual vehicle around the disappearance region of the lane or around the appearance region of the lane.

(6) In the above aspect (5), the control plan generation part may set the virtual vehicle as a stationary body around the disappearance region of the lane or around the appearance region of the lane.

(7) In the above aspect (1), the vehicle control apparatus may include a third detection part that detects an occlusion which indicates a state in which there is a possibility that the peripheral vehicle is present in a detection region of the first detection part and it is not possible to detect the peripheral vehicle by a screening object, wherein when the occlusion is detected by the third detection part, the control plan generation part may set the virtual vehicle around a region in which the occlusion occurs.

(8) In any one of the above aspects (1) to (7), the vehicle control apparatus may further include a target position candidate setting part that sets, when the vehicle performs a lane change, a lane change target position candidate which represents a position candidate of a lane change destination of the vehicle in an adjacent lane that is adjacent to a lane on which the vehicle travels, wherein the peripheral vehicle that satisfies the predetermined condition may be at least one of a frontward traveling vehicle that is traveling at a frontward position of the vehicle in the lane, a lane-change target-position candidate frontward-traveling vehicle that is traveling at a frontward position of the lane change target position candidate, and a lane-change target-position candidate rearward-traveling vehicle that is traveling at a rearward position of the lane change target position candidate.

(9) Another aspect of the present invention is a vehicle control method, by way of an in-vehicle computer, including: detecting a peripheral vehicle which is traveling around a vehicle; generating a control plan of the vehicle according to the detected peripheral vehicle; controlling acceleration, deceleration, or steering of the vehicle according to the generated control plan; generating the control plan of the vehicle according to a peripheral vehicle that satisfies a predetermined condition among one or more peripheral vehicles that are detected by the first detection part; and setting a virtual vehicle which virtually simulates the peripheral vehicle that satisfies the predetermined condition and generating the control plan of the vehicle when it is not possible to detect the peripheral vehicle that satisfies the predetermined condition.

(10) Still another aspect of the present invention is a vehicle control program that causes an in-vehicle computer to: detect a peripheral vehicle which is traveling around a vehicle; generate a control plan of the vehicle according to the detected peripheral vehicle; control acceleration, deceleration, or steering of the vehicle according to the generated control plan; generate the control plan of the vehicle according to a peripheral vehicle that satisfies a predetermined condition among one or more peripheral vehicles that are detected by the first detection part; and set a virtual vehicle which virtually simulates the peripheral vehicle that satisfies the predetermined condition and generate the control plan of the vehicle when it is not possible to detect the peripheral vehicle that satisfies the predetermined condition.

Advantage of the Invention

According to the aspects (1), (2), (9), and (10) described above, since the control plan of the vehicle is generated according to a peripheral vehicle that satisfies a predetermined condition among one or more peripheral vehicles that are detected by the first detection part, and when it is not possible to detect the peripheral vehicle that satisfies the predetermined condition, a virtual vehicle which virtually simulates the peripheral vehicle that satisfies the predetermined condition is set to generate the control plan of the vehicle, it is possible to perform further flexible automated driving.

According to the aspects (3), (4), and (6) described above, the virtual vehicle is set as a stationary body or a movable body, and therefore, it is possible to perform automated driving more safely.

According to the aspect (5) described above, when a disappearance region of a lane or an appearance region of a lane is detected, the virtual vehicle is set around the disappearance region of the lane or around the appearance region of the lane, and therefore, it is possible to perform further flexible automated driving in response to the travel lane.

According to the aspect (7) described above, when the occlusion is detected, the virtual vehicle is set around a region in which the occlusion occurs, and therefore, it is possible to perform further flexible automated driving in accordance with an environment when traveling.

According to the aspect (8) described above, when any one or more of the frontward traveling vehicle, the lane-change target-position candidate frontward-traveling vehicle, and the lane-change target-position candidate rearward-traveling vehicle are not detected by the detection part, a vehicle that is not detected by the detection part is set as the virtual vehicle, and therefore, it is possible to reduce the cost of calculating the state estimation of the peripheral vehicle which is performed when performing automated driving.

According to the aspects (6), (7), and (8) described above, the virtual vehicle is set as a stationary body or a movable body, and therefore, it is possible to perform automated driving further safely.

BRIEF DESCRIPTION OF THE DRAWINGS

FIG. 14 is a view showing patterns into which the position change of the peripheral vehicle is categorized with respect to Pattern (a) of the vehicle positional relationship.

DESCRIPTION OF THE EMBODIMENTS

Hereinafter, a vehicle control apparatus, a vehicle control method, and a vehicle control program according to embodiments of the present invention are described with reference to the drawings.

First Embodiment

Vehicle Configuration

Figure 1:
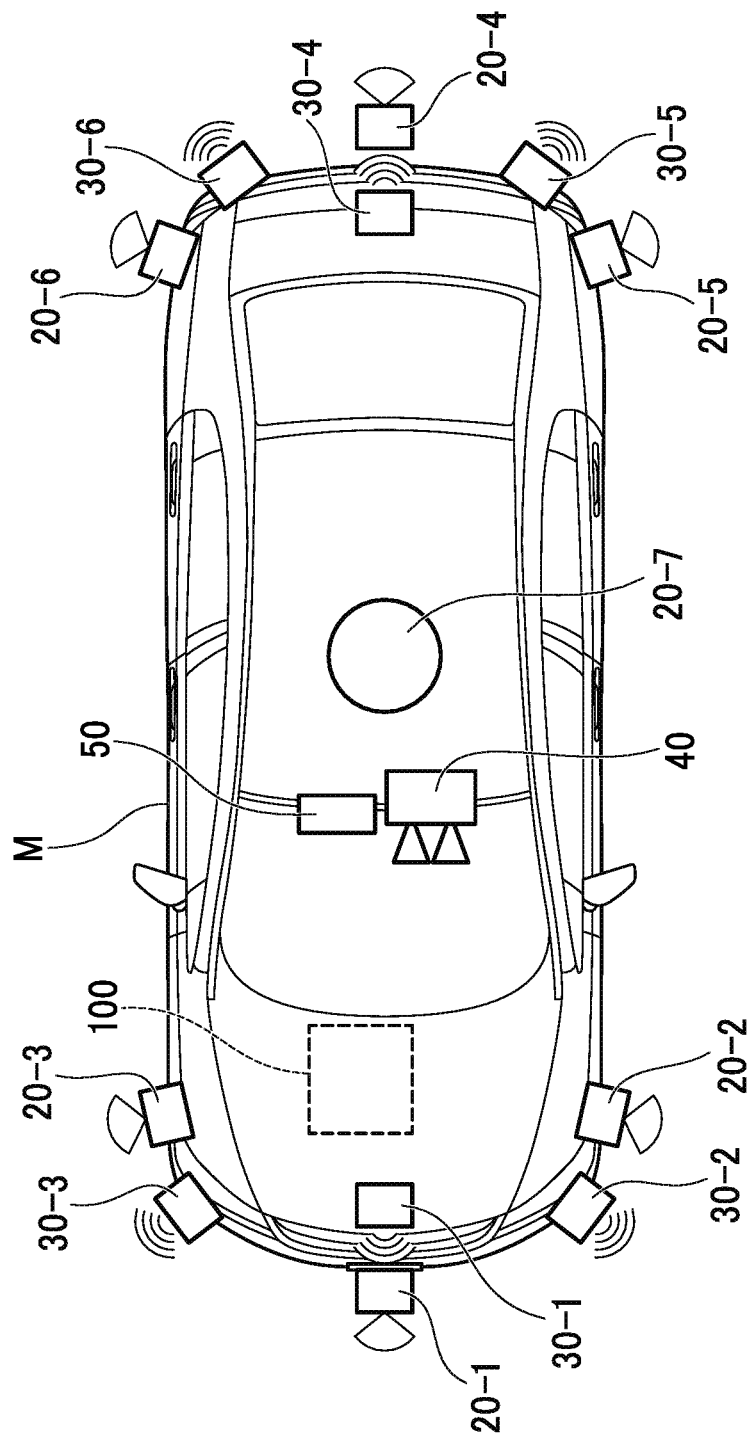
FIG. 1 is a view showing a configuration element included in a vehicle on which a vehicle control apparatus according to a first embodiment is provided.

FIG. 1 is a view showing a configuration element included in a vehicle M (hereinafter, also referred to as a first vehicle M) on which a vehicle control apparatus 100 according to a first embodiment is provided. A vehicle on which the vehicle control apparatus 100 is provided is, for example, an automobile having two wheels, three wheels, four wheels, or the like and includes an automobile using an internal combustion engine such as a diesel engine and a gasoline engine as a power source, an electric automobile using an electric motor as a power source, a hybrid automobile including both an internal combustion engine and an electric motor, and the like. The electric automobile described above is driven, for example, by using electric power discharged by a battery such as a secondary battery, a hydrogen fuel cell, a metallic fuel cell, and an alcohol fuel cell.

As shown in FIG. 1, a sensor such as finders 20-1 to 20-7, radars 30-1 to 30-6, and a camera 40, a navigation device 50, and the vehicle control apparatus 100 are provided on the vehicle. The finders 20-1 to 20-7 are, for example, LIDARs (Light Detection and Ranging, or Laser Imaging Detection and Ranging) that measure scattered light with respect to irradiation light and that measure a distance to a target. For example, the finder 20-1 is attached to a front grille and the like, and the finders 20-2 and 20-3 are attached to a side surface of a vehicle body, a door mirror, the inside of a head lamp, the vicinity of a side lamp, and the like. The finder 20-4 is attached to a trunk lid and the like, and the finders 20-5 and 20-6 are attached to a side surface of the vehicle body, the inside of a tail lamp, and the like. The finders 20-1 to 20-6 have, for example, a detection region of about 150 degrees with respect to a horizontal direction. The finder 20-7 is attached to a roof and the like. The finder 20-7 has, for example, a detection region of 360 degrees with respect to the horizontal direction.

The radars 30-1 and 30-4 are, for example, long-distance millimeter-wave radars having a wider detection region in a depth direction than that of other radars. The radars 30-2, 30-3, 30-5, and 30-6 are middle-distance millimeter-wave radars having a narrower detection region in the depth direction than that of the radars 30-1 and 30-4. Hereinafter, when the finders 20-1 to 20-7 are not specifically distinguished, the finders 20-1 to 20-7 are described simply as "a finder 20", and when the radars 30-1 to 30-6 are not specifically distinguished, the radars 30-1 to 30-6 are described simply as "a radar 30". The radar 30 detects an object, for example, by a FM-CW (Frequency Modulated Continuous Wave) method.

The camera 40 is, for example, a digital camera that uses a solid-state imaging element such as a CCD (Charge Coupled Device) or a CMOS (Complementary Metal Oxide Semiconductor). The camera 40 is attached to an upper part of a front window shield, a rear surface of a room mirror, and the like. For example, the camera 40 periodically and repeatedly captures an image of the frontward direction of the vehicle M.

The configuration shown in FIG. 1 is merely an example. Part of the configuration may be omitted, or another configuration may be further added.

Figure 2:
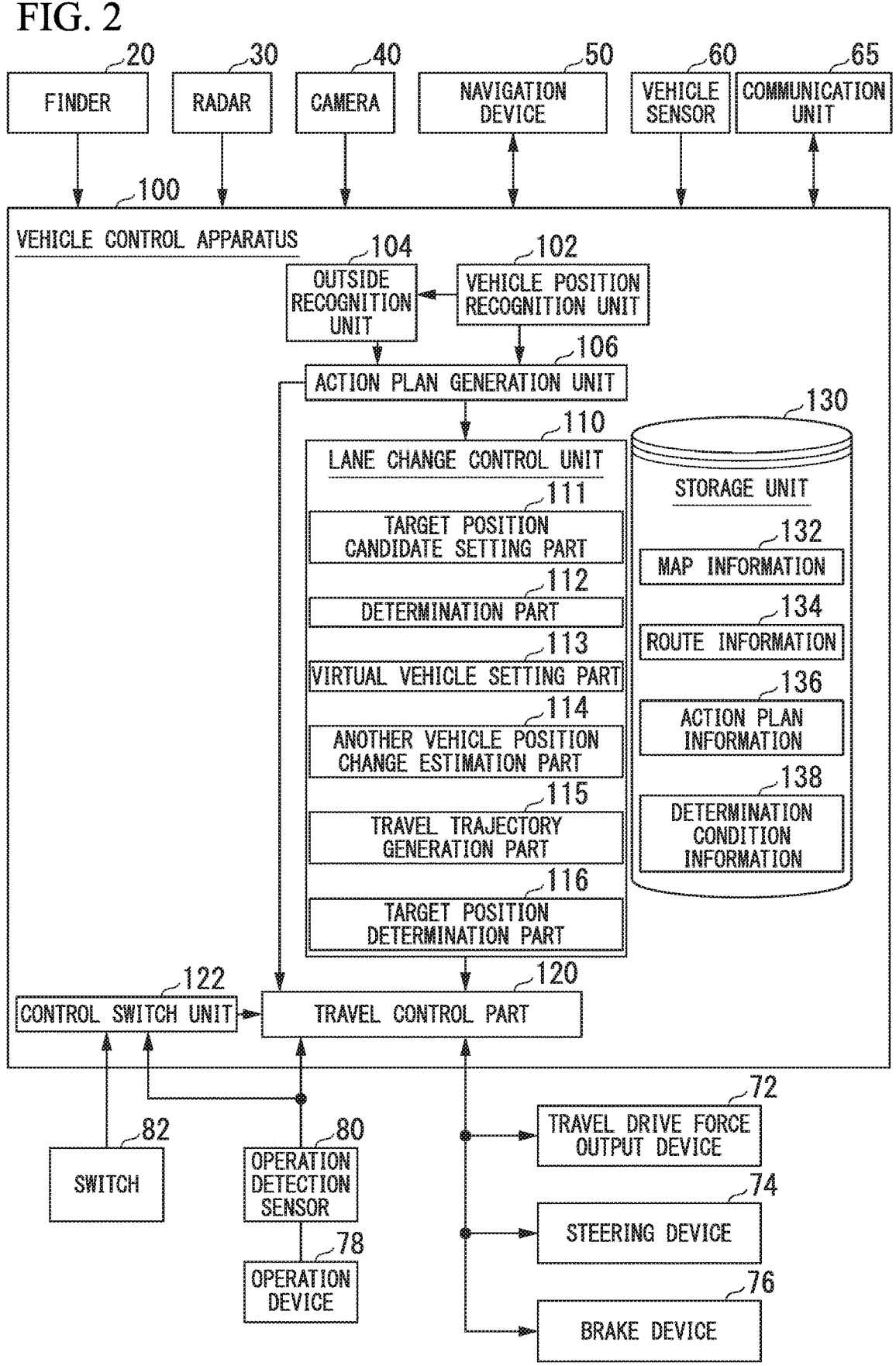
FIG. 2 is a function configuration view of a vehicle focusing on the vehicle control apparatus according to the first embodiment.

FIG. 2 is a function configuration view of the vehicle M focusing on the vehicle control apparatus 100 according to the first embodiment. The vehicle M includes the navigation device 50, a vehicle sensor 60, a communication unit 65, a travel drive force output device 72, a steering device 74, a brake device 76, an operation device 78, an operation detection sensor 80, a switch 82, and the vehicle control apparatus 100 in addition to the finder 20, the radar 30, and the camera 40. These devices and equipment are mutually connected by a multiplex communication line such as a CAN (Controller Area Network) communication line, a serial communication line, a wireless communication network, and the like.

The navigation device 50 has a GNSS (Global Navigation Satellite System) receiver, map information (navigation map), a touch-panel display device that functions as a user interface, a speaker, a microphone, and the like. The navigation device 50 identifies the position of the vehicle M by the GNSS receiver and derives a route to a destination that is assigned by a user from the position. The route that is derived by the navigation device 50 is stored in a storage part 130 as route information 134. The position of the vehicle M may be identified or supplemented by an INS (Inertial Navigation System) that utilizes an output of the vehicle sensor 60. The navigation device 50 performs a guide with respect to the route to the destination by speech or a navigation display when the vehicle control apparatus 100 is performing a manual driving mode. The configuration that identifies the position of the vehicle M may be provided independently from the navigation device 50. The navigation device 50 may be realized by, for example, a function of a terminal apparatus such as a smartphone or a tablet terminal held by a user. In this case, transmission and reception of information are performed using a radio frequency or a communication between the terminal apparatus and the vehicle control apparatus 100. The configuration that identifies the position of the vehicle M may be provided independently from the navigation device 50.

The vehicle sensor 60 includes a vehicle speed sensor that detects a vehicle speed, an acceleration sensor that detects acceleration, a yaw rate sensor that detects an angular speed around a vertical axis, an azimuth sensor that detects the direction of the vehicle M, and the like.

The communication unit 65 performs, for example, an inter-vehicle communication with a peripheral vehicle and acquires information such as the position and the speed of the peripheral vehicle. The communication unit 65 outputs the information such as the position and the speed acquired from the peripheral vehicle to the vehicle control apparatus 100.

The travel drive force output device 72 includes an engine and an engine ECU (Electronic Control Unit) that is configured to control the engine, for example, when the vehicle M is an automobile using an internal combustion engine as a power source. The travel drive force output device 72 includes a travel motor and a motor ECU that is configured to control the travel motor, for example, when the vehicle M is an electric automobile using an electric motor as a power source. The travel drive force output device 72 includes an engine, an engine ECU, a travel motor, and a motor ECU, for example, when the vehicle M is a hybrid automobile. When the travel drive force output device 72 includes only an engine, the engine ECU adjusts the throttle opening degree of the engine, a shift step, and the like and outputs a travel drive force (torque) by which the vehicle travels in accordance with information input from a travel control part 120 described below. When the travel drive force output device 72 includes only a travel motor, the motor ECU adjusts the duty ratio of a PWM signal that is given to the travel motor and outputs the travel drive force described above in accordance with information input from the travel control part 120. When the travel drive force output device 72 includes an engine and a travel motor, both of the engine ECU and the motor ECU controls a travel drive force in a mutually coordinated manner in accordance with information input from the travel control part 120.

The steering device 74 includes, for example, an electric motor, a steering torque sensor, a steering angle sensor, and the like. For example, the electric motor applies a force to a rack-and-pinion function and the like and changes the direction of a steering wheel. The steering torque sensor detects the torsion of a torsion bar, for example, when the steering wheel is operated, as a steering torque (steering force). The steering angle sensor detects, for example, a steering angle (or actual steering angle). The steering device 74 drives the electric motor and changes the direction of the steering wheel in accordance with information input from the travel control part 120.

The brake device 76 includes a master cylinder in which a brake operation applied to a brake pedal is transmitted as an oil pressure, a reservoir tank that reserves a brake fluid, a brake actuator that adjusts a brake force output to each wheel, and the like. A brake control part 44 controls a brake actuator and the like such that a brake torque which corresponds to the pressure of a master cylinder is output to each wheel in accordance with information input from the travel control part 120. The brake device 76 is not limited to an above-described electronically-controlled brake device which operates by the oil pressure and may be an electronically-controlled brake device which operates by an electric actuator.

The operation device 78 includes, for example, an accelerator pedal, a steering wheel, a brake pedal, a shift lever, and the like. An operation detection sensor 80 that detects the presence or absence of operation by a driver and the amount of operation is attached to the operation device 78. The operation detection sensor 80 includes, for example, an accelerator opening degree sensor, a steering torque sensor, a brake sensor, a shift position sensor, and the like. The operation detection sensor 80 outputs an accelerator opening degree, a steering torque, a brake press amount, a shift position, and the like as a detection result to the travel control part 120. Alternatively, the detection result of the operation detection sensor 80 may be directly output to the travel drive force output device 72, the steering device 74, or the brake device 76.

The switch 82 is a switch that is operated by a driver and the like. The switch 82 may be, for example, a mechanical switch that is arranged on the steering wheel, a garnish (dashboard), and the like or may be a GUI (Graphical User Interface) switch that is provided on a touch panel of the navigation device 50. The switch 82 accepts an operation of the driver or the like and generates a control mode designation signal that designates an operation mode by the travel control part 120 to any one of an automated driving mode and a manual driving mode to output the control mode designation signal to a control switch unit 122. The automated driving mode is a driving mode in which the vehicle travels in a state where the driver does not perform an operation (alternatively, the operation amount is smaller than that of the manual driving mode, or the operation frequency is small) as described above. More specifically, the automated driving mode is a driving mode in which part of or all of the travel drive force output device 72, the steering device 74, and the brake device 76 are controlled according to an action plan.

Vehicle Control Apparatus

Hereinafter, the vehicle control apparatus 100 is described. The vehicle control apparatus 100 includes, for example, a vehicle position recognition unit 102, an outside recognition unit 104, an action plan generation unit 106, a lane change control unit 110, a travel control unit 120, the control switch unit 122, and a storage unit 130. Part of or all of the vehicle position recognition unit 102, the outside recognition unit 104, the action plan generation unit 106, the lane change control unit 110, the travel control unit 120, and the control switch unit 122 are software function units that functions by executing a program by a processor such as a CPU (Central Processing Unit). Part of or all of the units may be hardware function units such as a LSI (Large Scale Integration) and an ASIC (Application Specific Integrated Circuit). The storage unit 130 is realized by a ROM (Read Only Memory), a RAM (Random Access Memory), a HDD (Hard Disk Drive), a flash memory, and the like. The program executed by the processor may be stored in the storage unit 130 in advance or may be downloaded from an external device via an in-vehicle Internet system and the like. The program executed by the processor may be installed in the storage unit 130 by mounting a portable storage medium that stores the program on a drive device (not shown).

The vehicle position recognition unit 102 recognizes the lane (travel lane) on which the vehicle M is travelling and the relative position of the vehicle M with respect to the travel lane according to map information 132 that is stored in the storage unit 130 and information that is input from the finder 20, the radar 30, the camera 40, the navigation device 50, or the vehicle sensor 60. The map information 132 is, for example, map information having higher accuracy than a navigation map included in the navigation device 50 and includes information of the center of a lane, information of the boundary of a lane, or the like. More specifically, the map information 132 includes road information, traffic regulation information, address information (address and zip code), facility information, phone number information, and the like. The road information includes information showing the class of a road such as a freeway, a toll road, a national road, or a prefectural road and information of the lane number of a road, the width of each lane, the gradient of a road, the position of a road (three-dimensional coordinate including the longitude, latitude, and height), the curvature of a curve of a lane, the position of merging and branching points of a lane, a sign provided on a road, and the like. The traffic regulation information includes information of the closure of a lane due to a work, a traffic accident, a traffic jam, and the like.

Figure 3:
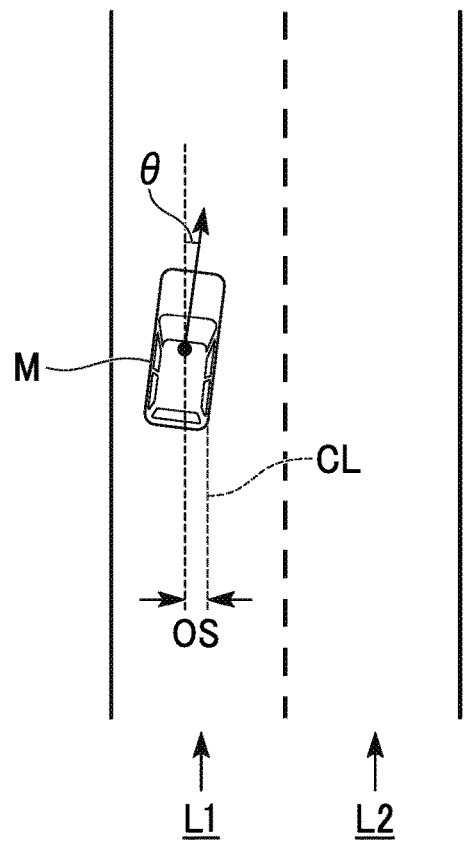
FIG. 3 is a view showing a state in which a relative position of a vehicle with respect to a travel lane is recognized by a vehicle position recognition unit.

FIG. 3 is a view showing a state in which the relative position of the vehicle M with respect to a travel lane L1 is recognized by the vehicle position recognition unit 102. For example, the vehicle position recognition unit 102 recognizes, as the relative position of the vehicle M with respect to the travel lane L1, a gap OS of a reference point (for example, the center of gravity) of the vehicle M from a travel lane center CL and an angle $\theta$ formed by the travel direction of the vehicle M with respect to a line formed of the continued travel lane centers CL. Alternatively, the vehicle position recognition unit 102 may recognize, as the relative position of the vehicle M with respect to the travel lane, the position of the reference point of the vehicle M with respect to any of side end parts of the travel lane L1 (the lane on which the vehicle M travels) and the like.

The outside recognition unit 104 recognizes a state of the position, speed, acceleration, and the like of a peripheral vehicle according to information that is input from the finder 20, the radar 30, the camera 40, and the like. The peripheral vehicle in the present embodiment is a vehicle that is traveling in the vicinity of the vehicle M and is a vehicle that is traveling in the same direction as the vehicle M. The position of a peripheral vehicle may be represented by a representative point such as the center of gravity or a corner of another vehicle (hereinafter, also referred to as a second vehicle) or may be represented by a region described by the outline of another vehicle. The "state" of a peripheral vehicle may include the acceleration of the peripheral vehicle and whether or not the peripheral vehicle is changing a lane (or whether or not the peripheral vehicle will change a lane) according to the information of the devices described above. The outside recognition unit 104 recognizes whether or not the peripheral vehicle is changing a lane (or whether or not the peripheral vehicle will change a lane) according to the position history of the peripheral vehicle, the operation state of a direction indicator, and the like. The outside recognition unit 104 may recognize positions of a guardrail, a power pole, a parked vehicle, a pedestrian, and other objects in addition to a peripheral vehicle. Hereinafter, the combination of the finder 20, the radar 30, the camera 40, and the outside recognition unit 104 is referred to as a "detection part DT" that detects a peripheral vehicle. The "detection part DT" may further recognize the state of the position, speed, and the like of a peripheral vehicle by a communication with the peripheral vehicle. The detection part DT in the first embodiment is an example of a "first detection part".

The action plan generation unit 106 generates an action plan in a predetermined zone. The predetermined zone is, for example, a zone, which includes a toll road such as an expressway, of the route that is derived by the navigation device 50. The predetermined zone is not limited thereto, and the action plan generation unit 106 may generate an action plan with respect to an arbitrary zone.

The action plan is constituted of, for example, a plurality events that are sequentially performed. Examples of the events include a deceleration event that decelerates the vehicle M, an acceleration event that accelerates the vehicle M, a lane keeping event that causes the vehicle M to travel so as not to be deviated from the travel lane, a lane change event that changes the travel lane, an overtaking event that causes the vehicle M to overtake a frontward traveling vehicle, a branching event that changes the lane to a desired lane at a branching point or causes the vehicle M to travel so as not to be deviated from the current travel lane, a merging event that causes the vehicle M to accelerate or decelerate at a lane merging point to change the travel lane, and the like. For example, when a junction (branching point) is present in a toll road (for example, an expressway or the like), it is necessary for the vehicle control apparatus 100 to change the lane or keep the lane such that the vehicle M proceeds to a target direction in an automated driving mode. Accordingly, when it is determined that a junction is present on the route with reference to the map information 132, the action plan generation unit 106 sets a lane change event that changes a lane to a desired lane by which it is possible to proceed to the destination direction, at a position from the current position (coordinate) of the vehicle M to the position (coordinate) of the junction. The information that indicates the action plan which is generated by the action plan generation unit 106 is stored in the storage part 130 as action plan information 136.

Figure 4:
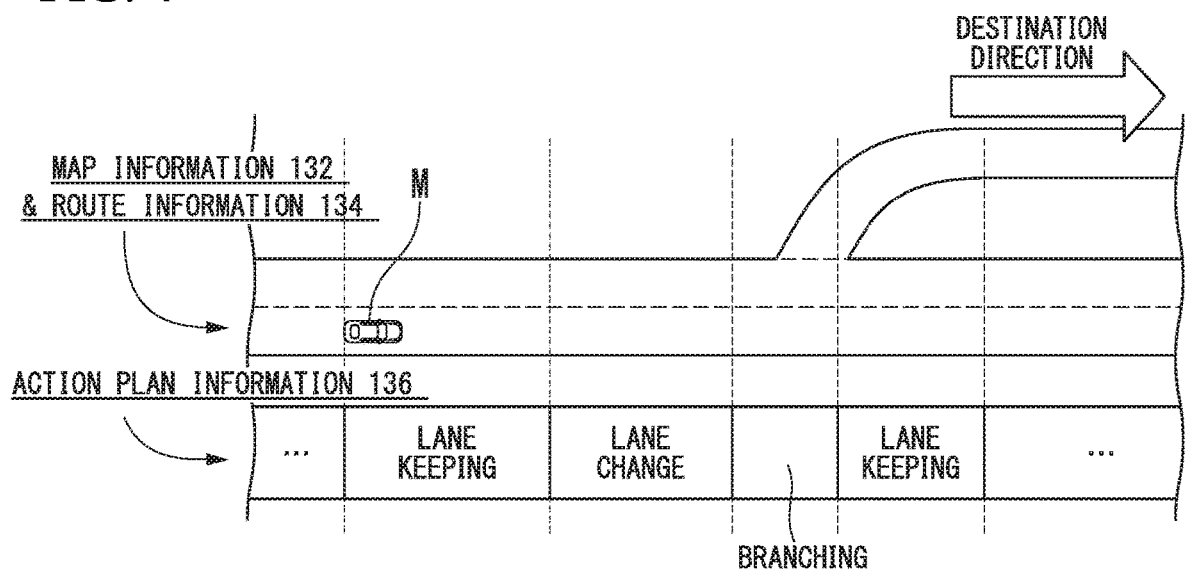
FIG. 4 is a view showing an example of an action plan that is generated with respect to a zone.

FIG. 4 is a view showing an example of an action plan that is generated with respect to a zone. As shown in the drawing, the action plan generation unit 106 categorizes situations that arise when traveling in accordance with the route to the destination and generates the action plan such that an event which is suitable for the individual situation is performed. The action plan generation unit 106 may change the action plan dynamically in response to the change in circumstances of the vehicle M.

The action plan generation unit 106 may change (update) the generated action plan, for example, according to the state of the outside environment that is recognized by the outside recognition unit 104. In general, the state of the outside environment constantly changes while the vehicle is traveling. Specifically, when the vehicle M travels on a road that includes a plurality of lanes, the distance spacing with another vehicle is relatively changed. For example, when another frontward vehicle suddenly brakes to reduce the speed, or another vehicle that is traveling on an adjacent lane cuts into the space in front of the vehicle M, it is necessary for the vehicle M to travel while appropriately changing the speed or the lane in accordance with the behavior of another frontward vehicle or the behavior of another vehicle on the adjacent lane. Accordingly, the action plan generation unit 106 may change the event that is set for each control zone in response to the state change of the outside environment as described above.

Specifically, when the speed of another vehicle that is recognized by the outside recognition unit 104 while the vehicle is traveling exceeds a threshold value, or when the movement direction of another vehicle that is traveling on the adjacent lane which is adjacent to the travel lane is directed to the travel lane direction, the action plan generation unit 106 changes the event that is set in a drive zone in which the vehicle M is scheduled to travel. For example, in a case where the event is set such that a lane change event is performed after a lane keeping event, when it is determined by the recognition result of the outside recognition unit 104 that, in the lane keeping event, a vehicle is proceeding at a speed that is equal to or more than the threshold value from the rearward direction of a lane which is a lane change destination, the action plan generation unit 106 changes the next event of the lane keeping event from the lane change to a deceleration event, a lane keeping event, or the like. Thereby, the vehicle control apparatus 100 can avoid the vehicle M colliding with the vehicle of the lane change destination. As a result, the vehicle control apparatus 100 can allow the vehicle M to automatically travel safely even when the state of the outside environment is changed.

Lane Change Event

The lane change control unit 110 performs a control when a lane change event that is included in the action plan by the action plan generation unit 106 is performed. The lane change control unit 110 includes, for example, a target position candidate setting part 111, a determination part 112, a virtual vehicle setting part 113, an another vehicle position change estimation part 114, a travel trajectory generation part 115, and a target position determination part 116. The combination of the determination part 112, the virtual vehicle setting part 113, the another vehicle position change estimation part 114, and the travel trajectory generation part 115 is an example of a control plan generation part.

Setting of Target Position Candidate

The target position candidate setting part 111 first sets the outline of a target region that becomes a lane change target with reference to the position of the peripheral vehicle that is recognized by the outside recognition unit 104 and sets, in the target region, a lane change target position candidate as a relative position with respect to a peripheral vehicle that is traveling on an adjacent lane which is adjacent to the travel lane (self-lane) on which the vehicle M is traveling. In the present embodiment, an example in which the target region corresponds to the entire detection region of a device is described. The target region may be a partial region of the detection region of the device.

Figure 5:
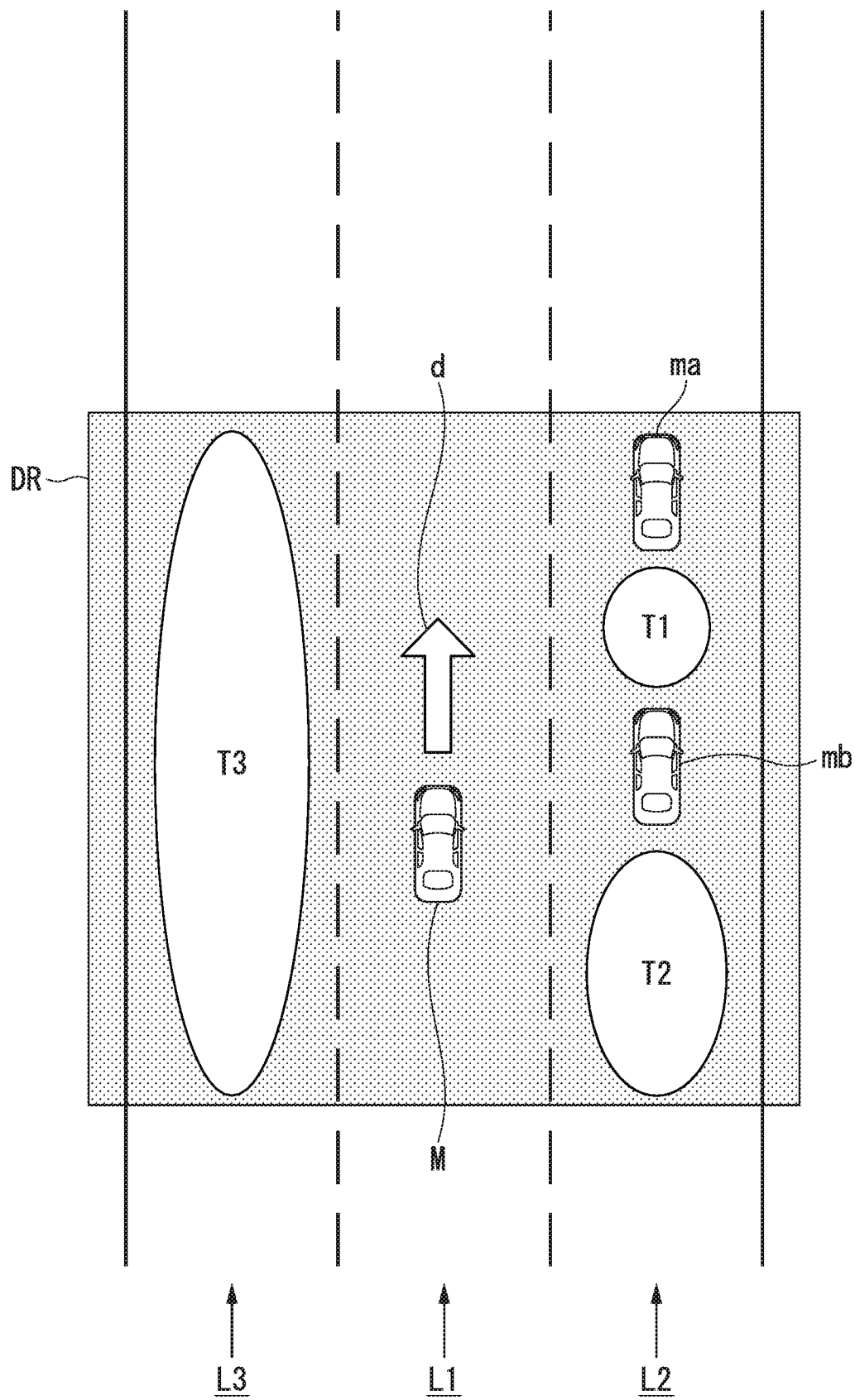
FIG. 5 is a view showing a state in which a target position candidate setting part in the first embodiment sets a lane change target position candidate.

FIG. 5 is a view showing a state in which the target position candidate setting part 111 in the first embodiment sets a lane change target position candidate. In the drawing, "ma", "mb" represent a peripheral vehicle, "d" represents a proceeding (travel) direction of each vehicle, "L1" represents a travel lane, and "L2", "L3" represent an adjacent lane. "DR" represents a detection region, and "T1" to "T3" represent a lane change target position candidate. When the lane change target position candidates are not specifically distinguished, the lane change target position candidates are represented simply as a lane change target position candidate T.

In the case of an example of FIG. 5, the target position candidate setting part 111 sets the lane change target position candidate T1 between the vehicle ma and the vehicle mb on the adjacent lane L2 and sets the lane change target position candidate T2 at a space from a rearward position of the vehicle mb to an outer edge of the detection region DR on the rearward side with respect to the vehicle proceeding direction d. That is, when a plurality of peripheral vehicles are present on the adjacent lane, the target position candidate setting part 111 sets the lane change target position candidate T between the peripheral vehicles. For example, when the number of the peripheral vehicles that are present is n, the number of the lane change target position candidates T that are set in the detection region DR on the adjacent lane by the target position candidate setting part 111 is (n+1). In the example of FIG. 5, the frontward position of the vehicle ma is the boundary of the detection region D, and therefore, the target position candidate T cannot be set at the frontward position of the vehicle ma. Accordingly, two vehicles are present on the adjacent lane L2, and therefore, the target position candidate setting part 111 needs to set three lane change target position candidates T; however, the target position candidate T cannot be set at the frontward position of the vehicle ma, and therefore, two lane change target position candidates T are set.

A peripheral vehicle is not present on the adjacent lane L3, and therefore, the target position candidate setting part 111 sets the lane change target position candidate T3 at a space from a frontward outer edge of the detection region DR with respect to the vehicle proceeding direction d to a rearward outer edge of the detection region DR with respect to the vehicle proceeding direction d on the adjacent lane L3. That is, when a peripheral vehicle is not present on the adjacent lane, the target position candidate setting part 111 sets one lane change target position candidate T in the entire detection region DR (in the entire adjacent lane L3) on the adjacent lane. In the following description, unless otherwise specified, it is assumed that the action plan commands to change the lane to the adjacent lane L2 that extends on the right side of the travel lane L1.

When a case in which the lane is changed to the lane change target position candidate T that is set by the target position candidate setting part 111 is assumed, the determination part 112 determines whether or not a peripheral vehicle that satisfies a predetermined condition is recognized by the outside recognition unit 104.

A peripheral vehicle that satisfies a predetermined condition being recognized is at least one of: a peripheral vehicle (hereinafter, referred to as a "frontward traveling vehicle") that is traveling at a frontward position of (immediately before) the vehicle M in the travel lane being recognized by the outside recognition unit 104; a peripheral vehicle (hereinafter, referred to as a "lane-change target-position candidate frontward-traveling vehicle") that is traveling at a frontward position of (immediately before) the lane change target position candidate T that is set by the target position candidate setting part 111 being recognized by the outside recognition unit 104; and a peripheral vehicle (hereinafter, referred to as a "lane-change target-position candidate rearward-traveling vehicle") that is traveling at a rearward position of (immediately after) the lane change target position candidate T that is set by the target position candidate setting part 111 being recognized by the outside recognition unit 104.

When any one or more vehicles of the frontward traveling vehicle, the lane-change target-position candidate frontward-traveling vehicle, and the lane-change target-position candidate rearward-traveling vehicle are not recognized by the outside recognition unit 104, the virtual vehicle setting part 113 sets a virtual vehicle which virtually simulates an unrecognized vehicle.

The another vehicle position change estimation part 114 estimates a future position change with respect to the frontward traveling vehicle, the lane-change target-position candidate frontward-traveling vehicle, and the lane-change target-position candidate rearward-traveling vehicle. In this case, when any one or more vehicles of the frontward traveling vehicle, the lane-change target-position candidate frontward-traveling vehicle, and the lane-change target-position candidate rearward-traveling vehicle are not recognized by the outside recognition unit 104, the another vehicle position change estimation part 114 estimates a future position change with respect to the vehicle that is recognized by the outside recognition unit 104 of the three vehicles and the virtual vehicle that is set by the virtual vehicle setting part 113 in response to the vehicle being unrecognized.

The travel trajectory generation part 115 generates a travel trajectory for a lane change according to the position change of the peripheral vehicle that is estimated by the another vehicle position change estimation part 114 for each lane change target position candidate T that is set by the target position candidate setting part 111. The travel trajectory is an example of a control plan.

The target position determination part 116 determines one lane change target position T# from a plurality of lane change target position candidates T that are set by the target position candidate setting part 111 according to the travel trajectory that is generated for each lane change target position candidate T by the travel trajectory generation part 115.

Figure 6:
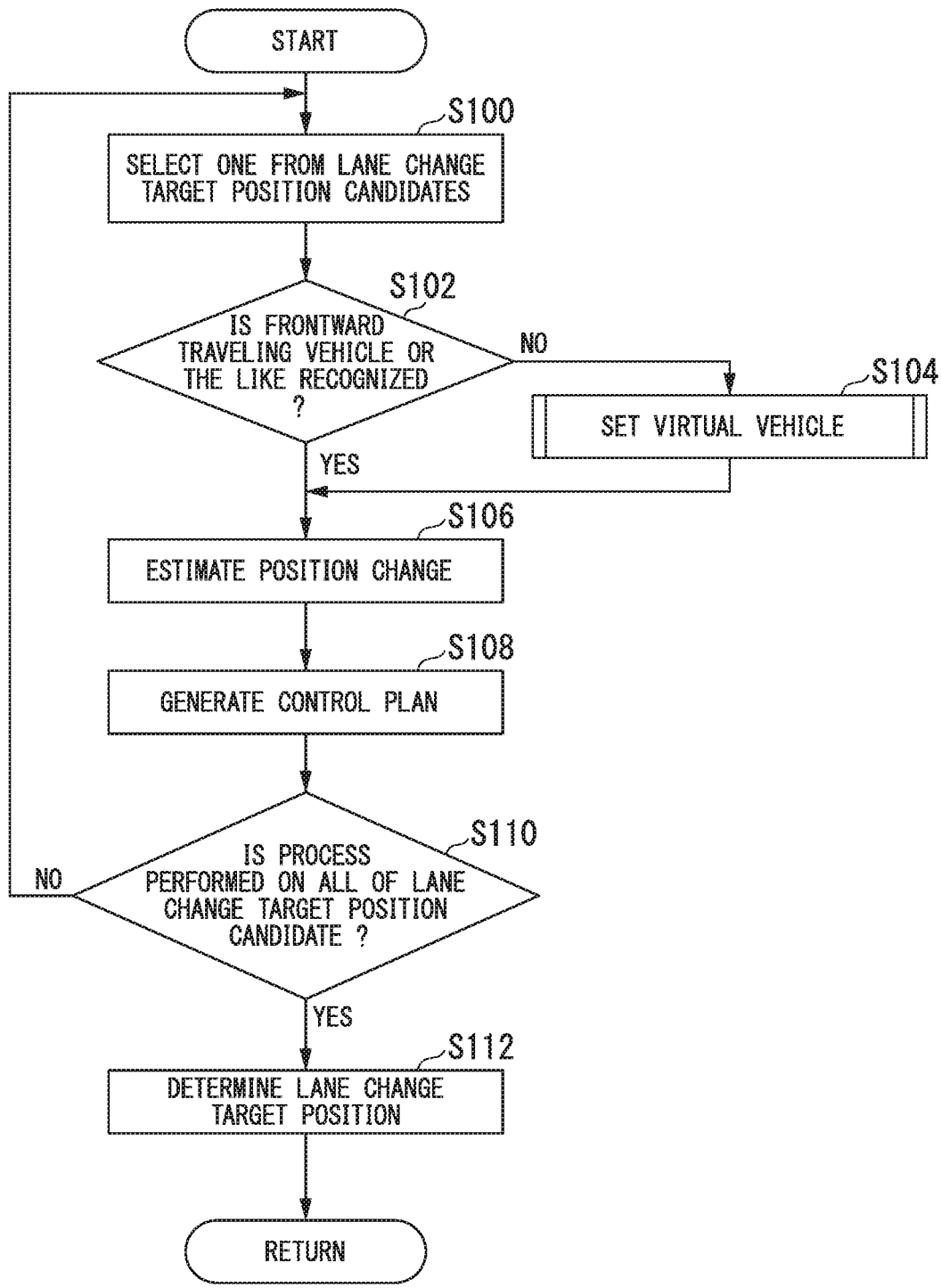
FIG. 6 is a flowchart showing an example of a process flow of a lane change control part in the first embodiment.

Hereinafter, a specific process of the lane change control unit 110 is described with reference to a flowchart. FIG. 6 is a flowchart showing an example of a process flow of the lane change control part 110 in the first embodiment.

First, the target position candidate setting part 111 selects one from the lane change target position candidates T (Step S100). Next, when a case in which the lane is changed to the lane change target position candidate T that is selected by the target position candidate setting part 111 is assumed, the determination part 112 determines whether or not the frontward traveling vehicle, the lane-change target-position candidate frontward-traveling vehicle, and the lane-change target-position candidate rearward-traveling vehicle are recognized (detected) by the outside recognition unit 104 (detection part DT) (Step S102).

When any one or more vehicles of the frontward traveling vehicle, the lane-change target-position candidate frontward-traveling vehicle, and the lane-change target-position candidate rearward-traveling vehicle are not recognized by the outside recognition unit 104, the virtual vehicle setting part 113 sets a virtual vehicle which virtually simulates an unrecognized vehicle (Step S104).

Figure 7:
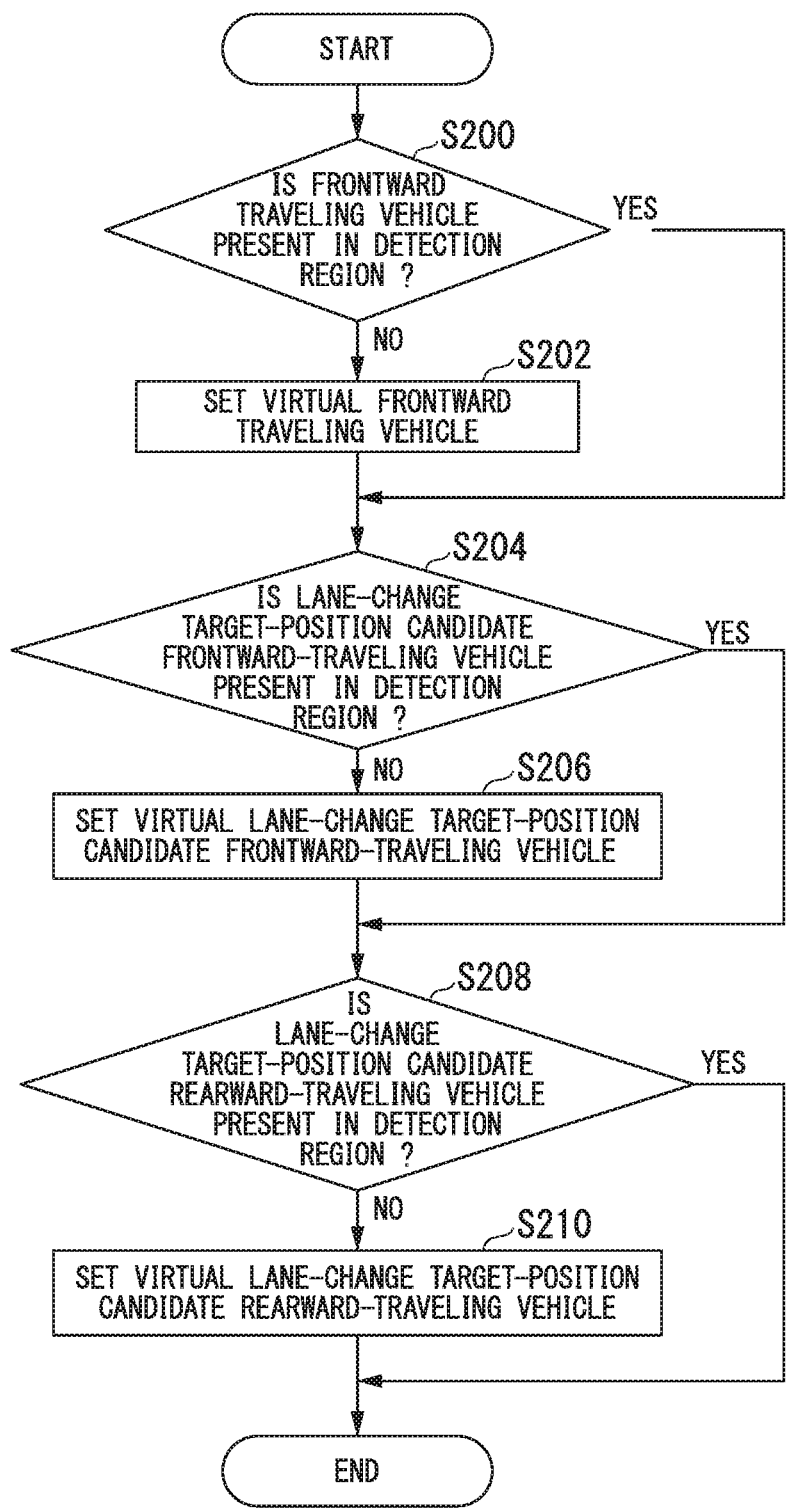
FIG. 7 is a flowchart showing an example of a flow of a setting process of a virtual vehicle.

Hereinafter, a setting process of a virtual vehicle which is the process of Step S104 is described. FIG. 7 is a flowchart showing an example of the flow of the setting process of a virtual vehicle. The process of the present flowchart corresponds to the process of Step S104 in the flowchart of FIG. 6 described above.

First, the determination part 112 determines whether or not a frontward traveling vehicle is recognized by the outside recognition unit 104 (Step S200). In a case where a frontward traveling vehicle is not recognized by the outside recognition unit 104, the virtual vehicle setting part 113 sets a virtual vehicle which virtually simulates a frontward traveling vehicle in a predetermined state, in the vicinity of the outer edge of the detection region in the frontward direction of the travel lane (Step S202).

The predetermined state includes a state in which the speed of the virtual vehicle is zero, a state in which the speed (or acceleration) of the virtual vehicle is equal to or less than a threshold value, and a state in which the speed of the virtual vehicle is the same as the speed of the vehicle M. For example, the virtual vehicle setting part 113 may set a virtual vehicle that is stopping in the vicinity of the outer edge of the detection region DR or may set a virtual vehicle that is slowly traveling at a certain speed. In the present embodiment, the virtual vehicle setting part 113 sets a virtual vehicle as a stationary body that is stopping when a frontward traveling vehicle is not recognized.

Figure 8:
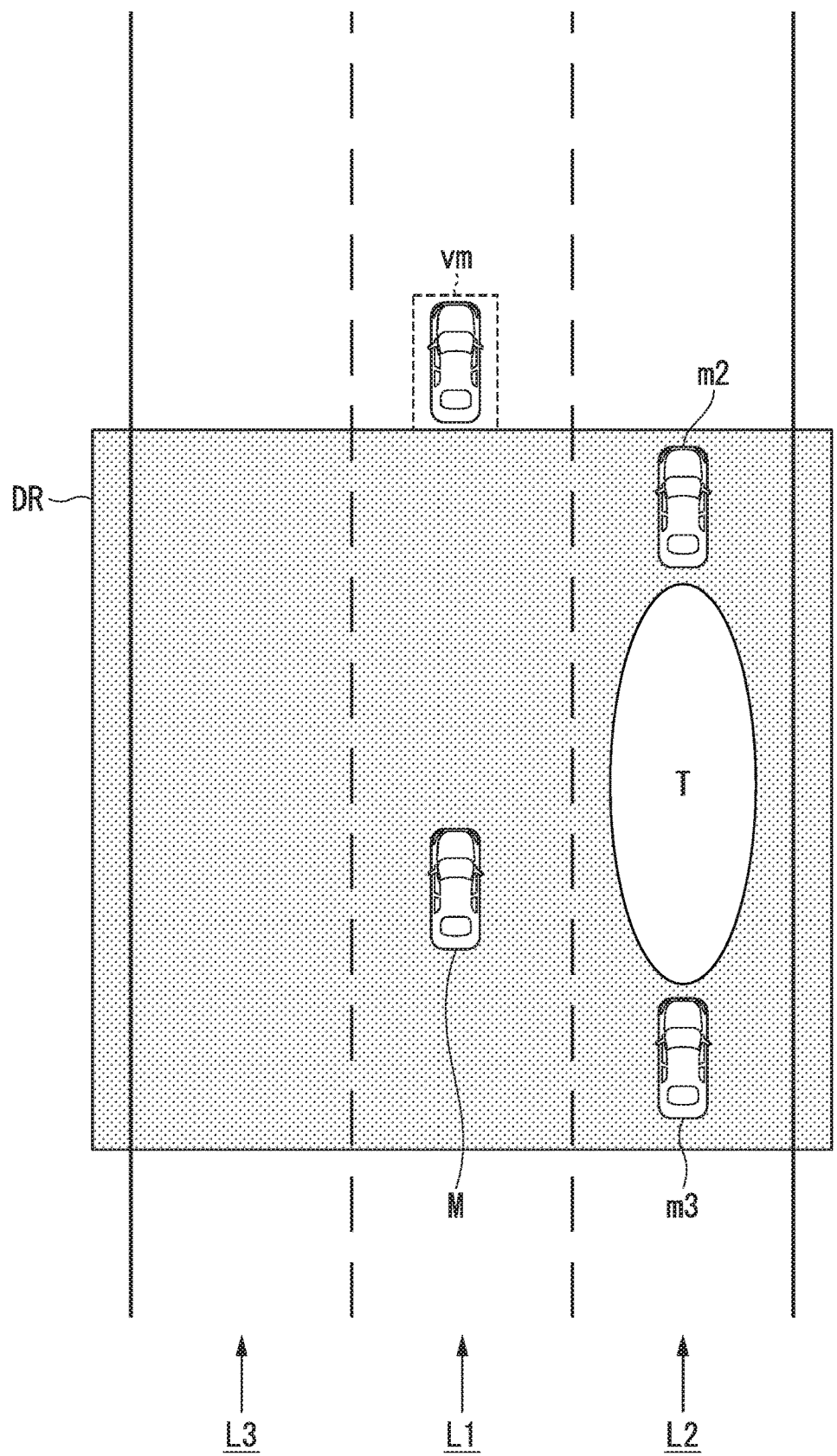
FIG. 8 is a view showing an example of a scene in which a frontward traveling vehicle is not recognized in a detection region.

FIG. 8 is a view showing an example of a scene in which a frontward traveling vehicle is not recognized in the detection region DR. In the example of FIG. 8, the travel lane is represented by "L1", the adjacent lane on the right side of the travel lane L1 is represented by "L2", the adjacent lane on the left side of the travel lane L1 is represented by "L3", and the lane change target position candidate is represented by "T". In the example of FIG. 8, the peripheral vehicle m2 is located at a frontward position of the lane change target position candidate T in the adjacent lane L2 and is therefore recognized as the lane-change target-position candidate frontward-traveling vehicle. The peripheral vehicle m3 is located at a rearward position of the lane change target position candidate T in the adjacent lane L2 and is therefore recognized as the lane-change target-position candidate rearward-traveling vehicle. A vehicle that is located at a frontward position of the vehicle M in the travel lane L1 is not detected, and therefore, the frontward traveling vehicle is not recognized. Accordingly, the virtual vehicle setting part 113 sets a virtual vehicle vm as a stationary body in the vicinity of the outer edge of the detection region DR in the frontward direction of the travel lane L1.

Figure 9:
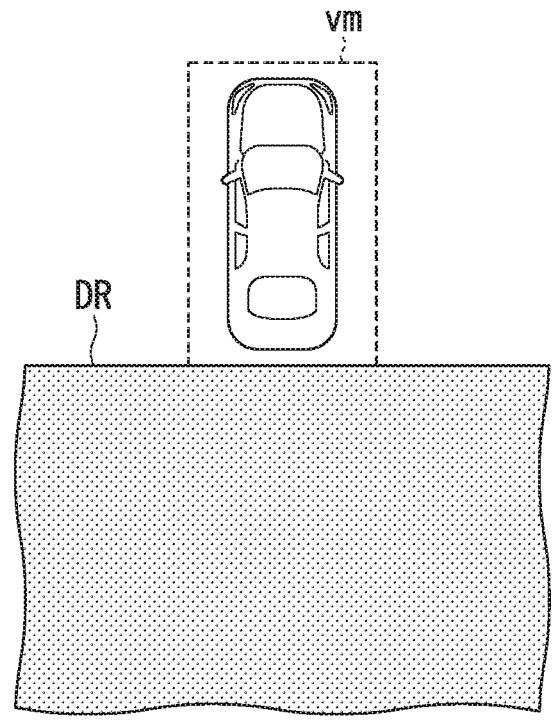
FIG. 9 is a view showing an example of a state in which the virtual vehicle is set in the vicinity of an outer edge of the detection region.

Specifically, the virtual vehicle setting part 113 sets a virtual vehicle such that a rear end part of the vehicle body is located on the outside of the detection region DR. FIG. 9 is a view showing an example of a state in which the virtual vehicle vm is set in the vicinity of the outer edge of the detection region DR. As shown in FIG. 9, the virtual vehicle setting part 113 arranges the virtual vehicle on the outside of the outer edge such that the entire vehicle body region is not included in the detection region DR.

Figure 10:
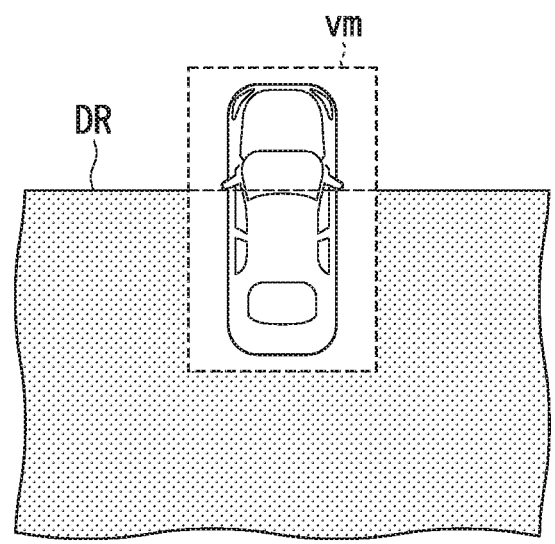
FIG. 10 is a view showing another example of the state in which the virtual vehicle is set in the vicinity of the outer edge of the detection region.

The virtual vehicle setting part 113 may set a virtual vehicle such that the rear end part of the vehicle body is located on the inside of the detection region DR. FIG. 10 is a view showing another example of the state in which the virtual vehicle vm is set in the vicinity of the outer edge of the detection region DR. As shown in FIG. 10, the virtual vehicle setting part 113 arranges the virtual vehicle on the outer edge such that part of the vehicle body region is included in the detection region DR. The virtual vehicle setting part 113 may arrange the virtual vehicle on the inside of the outer edge such that the entire vehicle body region is included in the detection region DR. The virtual vehicle setting part 113 sets the virtual vehicle, for example, at a center CL of the travel lane regarding the lane width direction with respect to the lane proceeding direction. The virtual vehicle setting part 113 may set the virtual vehicle at a position that is away from the center CL regarding the lane width direction.

Next, the determination part 112 determines whether or not the lane-change target-position candidate frontward-traveling vehicle is recognized by the outside recognition unit 104 (Step S204). In a case where the lane-change target-position candidate frontward-traveling vehicle is not recognized by the outside recognition unit 104, the virtual vehicle setting part 113 sets a virtual vehicle which virtually simulates the unrecognized lane-change target-position candidate frontward-traveling vehicle in a predetermined state, in the vicinity of the outer edge of the detection region in the frontward direction of the adjacent lane (Step S206). In the present embodiment, similarly to a case where a virtual vehicle which virtually simulates a frontward traveling vehicle is set, the virtual vehicle setting part 113 sets a virtual vehicle which virtually simulates the lane-change target-position candidate frontward-traveling vehicle in a still state.

Figure 11:
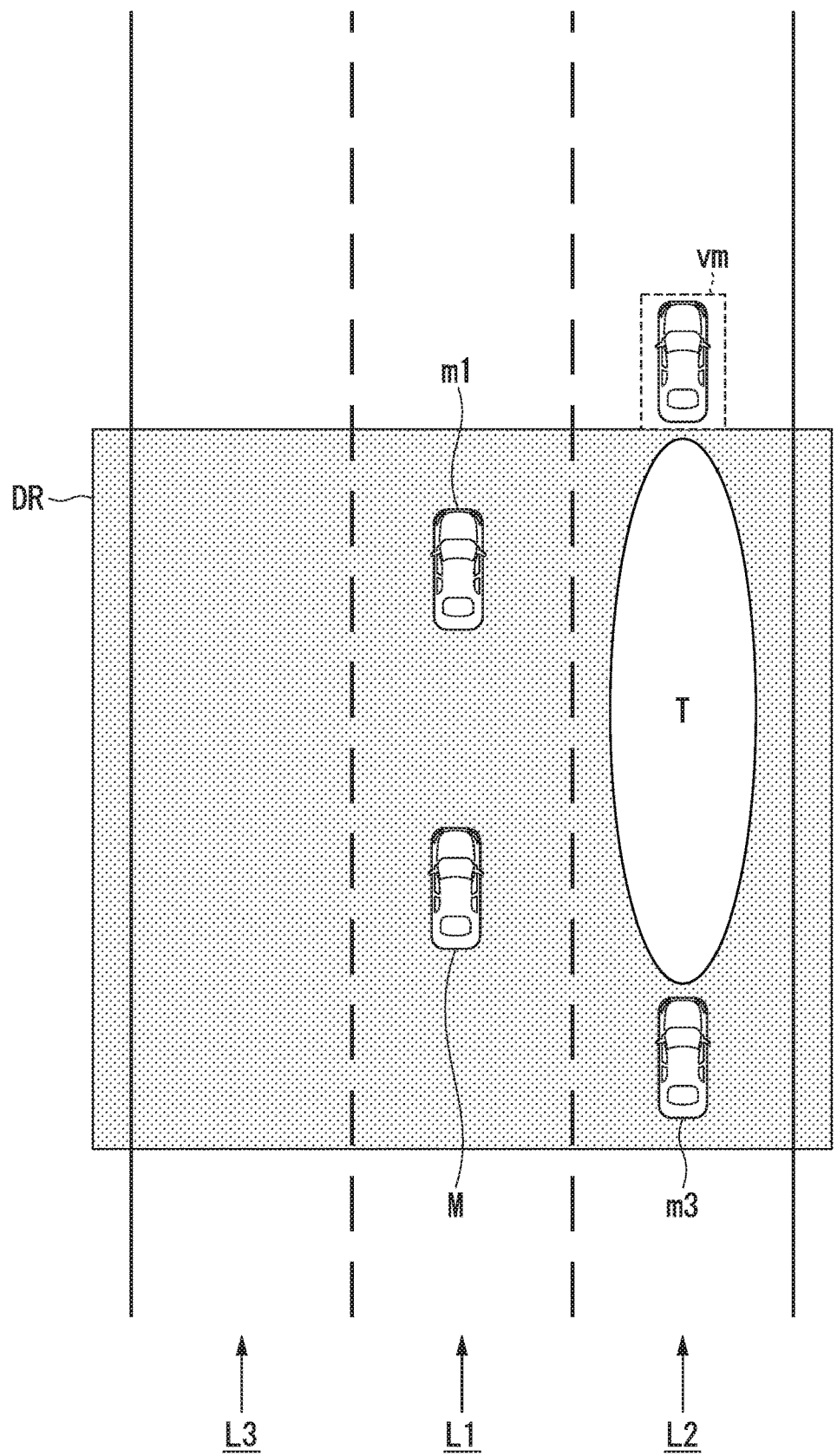
FIG. 11 is a view showing an example of a scene in which a lane-change target-position candidate frontward-traveling vehicle is not recognized in the detection region.

FIG. 11 is a view showing an example of a scene in which a lane-change target-position candidate frontward-traveling vehicle is not recognized in the detection region DR. In the example of FIG. 11, similarly to FIG. 8, the travel lane is represented by "L1", the adjacent lane on the right side of the travel lane L1 is represented by "L2", the adjacent lane on the left side of the travel lane L1 is represented by "L3", and the lane change target position candidate is represented by "T". In the example of FIG. 11, the peripheral vehicle m1 is located at a frontward position of the vehicle M in the travel lane L1 and is therefore recognized as the frontward traveling vehicle. The peripheral vehicle m3 is located at a rearward position of the lane change target position candidate T in the adjacent lane L2 and is therefore recognized as the lane-change target-position candidate rearward-traveling vehicle. A vehicle that is located at a frontward position of the lane change target position candidate T in the adjacent lane L2 is not detected, and therefore, the lane-change target-position candidate frontward-traveling vehicle is not recognized. Accordingly, the virtual vehicle setting part 113 sets a virtual vehicle vm which virtually simulates the lane-change target-position candidate frontward-traveling vehicle as a stationary body, in the vicinity of the outer edge of the detection region DR in the frontward direction of the adjacent lane L2.

The arrangement position of the virtual vehicle vm that is set in the vicinity of the outer edge of the detection region DR when the lane-change target-position candidate frontward-traveling vehicle is not recognized is similar to that of the case in which the virtual vehicle of the frontward traveling vehicle is arranged as described above. For example, the virtual vehicle setting part 113 may set a virtual vehicle such that a rear end part of the vehicle body is located on the outside of the detection region DR or may set a virtual vehicle such that a rear end part of the vehicle body is located on the inside of the detection region DR.

Next, the determination part 112 determines whether or not the lane-change target-position candidate rearward-traveling vehicle is recognized by the outside recognition unit 104 (Step 208). In a case where the lane-change target-position candidate rearward-traveling vehicle is not recognized by the outside recognition unit 104, the virtual vehicle setting part 113 sets a virtual vehicle which virtually simulates the unrecognized lane-change target-position candidate rearward-traveling vehicle in a movable state (as a movable body), in the vicinity of the outer edge of the detection region DR in the frontward direction of the adjacent lane (Step S210).

The movable state includes a state in which the speed (or acceleration) of the virtual vehicle is a threshold value or more.

For example, the virtual vehicle setting part 113 may set a virtual vehicle that travels at a speed of constant number of times (including one time) of the maximum speed possible, in the vicinity of the outer edge of the detection region DR or may set a virtual vehicle that is traveling at a speed of constant times (including one time) of the speed of the vehicle M or the lane-change target-position candidate frontward-traveling vehicle. In the present embodiment, the virtual vehicle setting part 113 sets the virtual vehicle as a movable body that is traveling at a possible maximum speed.

Figure 12:
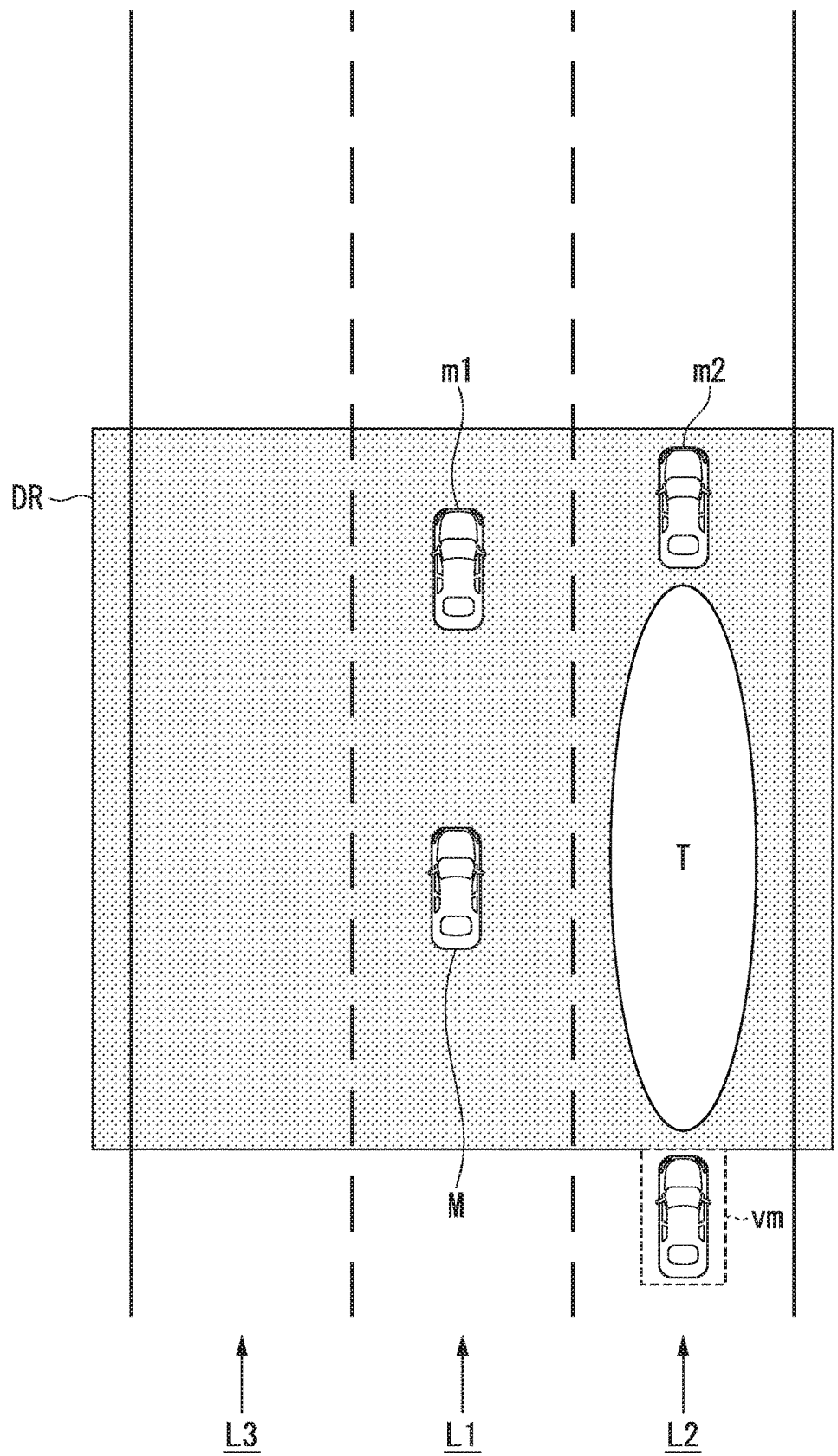
FIG. 12 is a view showing an example of a scene in which a lane-change target-position candidate rearward-traveling vehicle is not recognized in the detection region.

FIG. 12 is a view showing an example of a scene in which the lane-change target-position candidate rearward-traveling vehicle is not recognized in the detection region DR. In the example of FIG. 12, similarly to FIG. 8 and FIG. 11, the travel lane is represented by "L1", the adjacent lane on the right side of the travel lane L1 is represented by "L2", the adjacent lane on the left side of the travel lane L1 is represented by "L3", and the lane change target position candidate is represented by "T". In the example of FIG. 12, the peripheral vehicle m1 is located at a frontward position of the vehicle M in the travel lane L1 and is therefore recognized as the frontward traveling vehicle. The peripheral vehicle m2 is located at a frontward position of the lane change target position candidate T in the adjacent lane L2 and is therefore recognized as the lane-change target-position candidate frontward-traveling vehicle. A vehicle that is located at a rearward position of the lane change target position candidate T in the adjacent lane L2 is not detected, and therefore, the lane-change target-position candidate rearward-traveling vehicle is not recognized. Accordingly, the virtual vehicle setting part 113 sets a virtual vehicle vm which virtually simulates the lane-change target-position candidate rearward-traveling vehicle as a stationary body, in the vicinity of the outer edge of the detection region DR in the rearward direction of the adjacent lane L2.

The arrangement position of the virtual vehicle vm that is set in the vicinity of the outer edge of the detection region DR when the lane-change target-position candidate rearward-traveling vehicle is not recognized is similar to the arrangement position of the virtual vehicle in the case of the frontward traveling vehicle or the lane-change target-position candidate frontward-traveling vehicle described above. For example, the virtual vehicle setting part 113 may set a virtual vehicle such that a front end part of the vehicle body is located on the outside of the detection region DR or may set a virtual vehicle such that a front end part of the vehicle body is located on the inside of the detection region DR.

According to the process of the flowchart described above, it is possible to set a virtual vehicle for each peripheral vehicle that satisfies a predetermined condition.

The flowchart of FIG. 6 is described. When the frontward traveling vehicle, the lane-change target-position candidate frontward-traveling vehicle, and the lane-change target-position candidate rearward-traveling vehicle are recognized by the outside recognition unit 104 in the process of Step S102, the another vehicle position change estimation part 114 estimates a future position change with respect to the frontward traveling vehicle, the lane-change target-position candidate frontward-traveling vehicle, and the lane-change target-position candidate rearward-traveling vehicle that are recognized by the outside recognition unit 104, in a state where a virtual vehicle is not set (Step S106).

It is possible to estimate the future position change, for example, according to a constant speed model in which it is assumed that a vehicle travels while keeping the current speed, a constant acceleration model in which it is assumed that a vehicle travels while keeping the current acceleration, or a variety of other models. The another vehicle position change estimation part 114 may consider the steering angle of a peripheral vehicle (including a virtual vehicle) with which the vehicle M will interfere with a high chance when changing a lane or may assume that the peripheral vehicle travels while keeping the current travel lane to estimate the position change without considering the steering angle. In the following description, it is assumed that the peripheral vehicle travels while keeping the current speed and maintaining the travel lane to estimate the position change.

Figure 13:
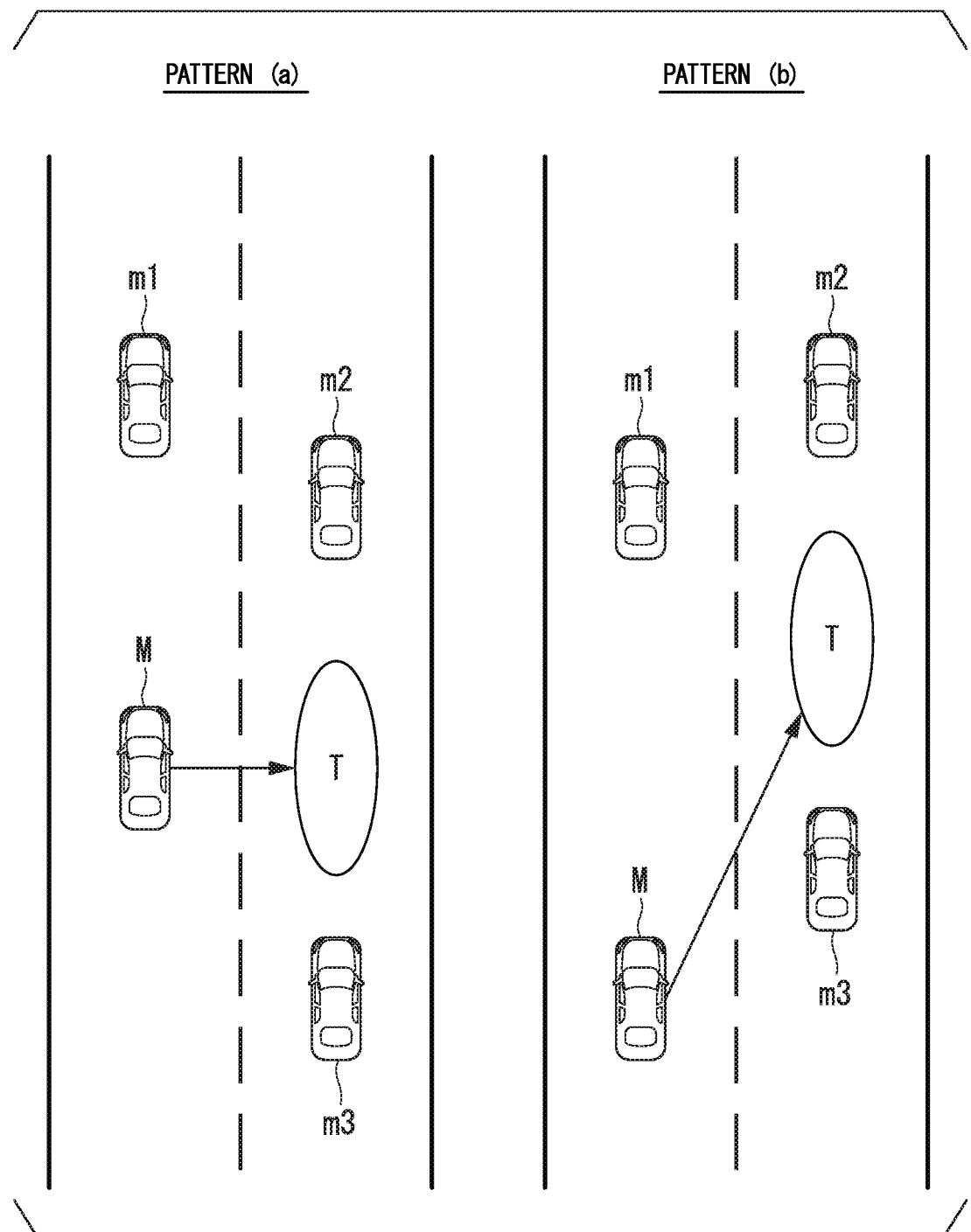
FIG. 13 is a view showing an example of, in a case where a peripheral vehicle that becomes a determination target is recognized, a positional relationship between the vehicle and the peripheral vehicle.

FIG. 13 is a view showing an example of, in a case where a peripheral vehicle that becomes a determination target is recognized, a positional relationship between the vehicle M and the peripheral vehicle. In FIG. 13, "M" represents a vehicle, the peripheral vehicle m1 represents a frontward traveling vehicle, the peripheral vehicle m2 represents a lane-change target-position candidate frontward-traveling vehicle, the peripheral vehicle m3 represents a lane-change target-position candidate rearward-traveling vehicle, and "T" represents the lane change target position candidate. For example, Pattern (a) represents a positional relationship of m1-m2-M-m3 in the order from the vehicle proceeding direction and shows an example in which the vehicle M changes the lane without changing the relative position with the peripheral vehicle. Pattern (b) represents a positional relationship of m2-m1-m3-M in the order from the vehicle proceeding direction and shows an example in which the vehicle M changes the lane while advancing (relatively accelerating) the relative position with the peripheral vehicle.

For example, the another vehicle position change estimation part 114 categorizes the future position change according to speed models of the peripheral vehicles m1, m2, and m3 for each pattern in which the vehicle positional relationship is categorized.

Figure 15:
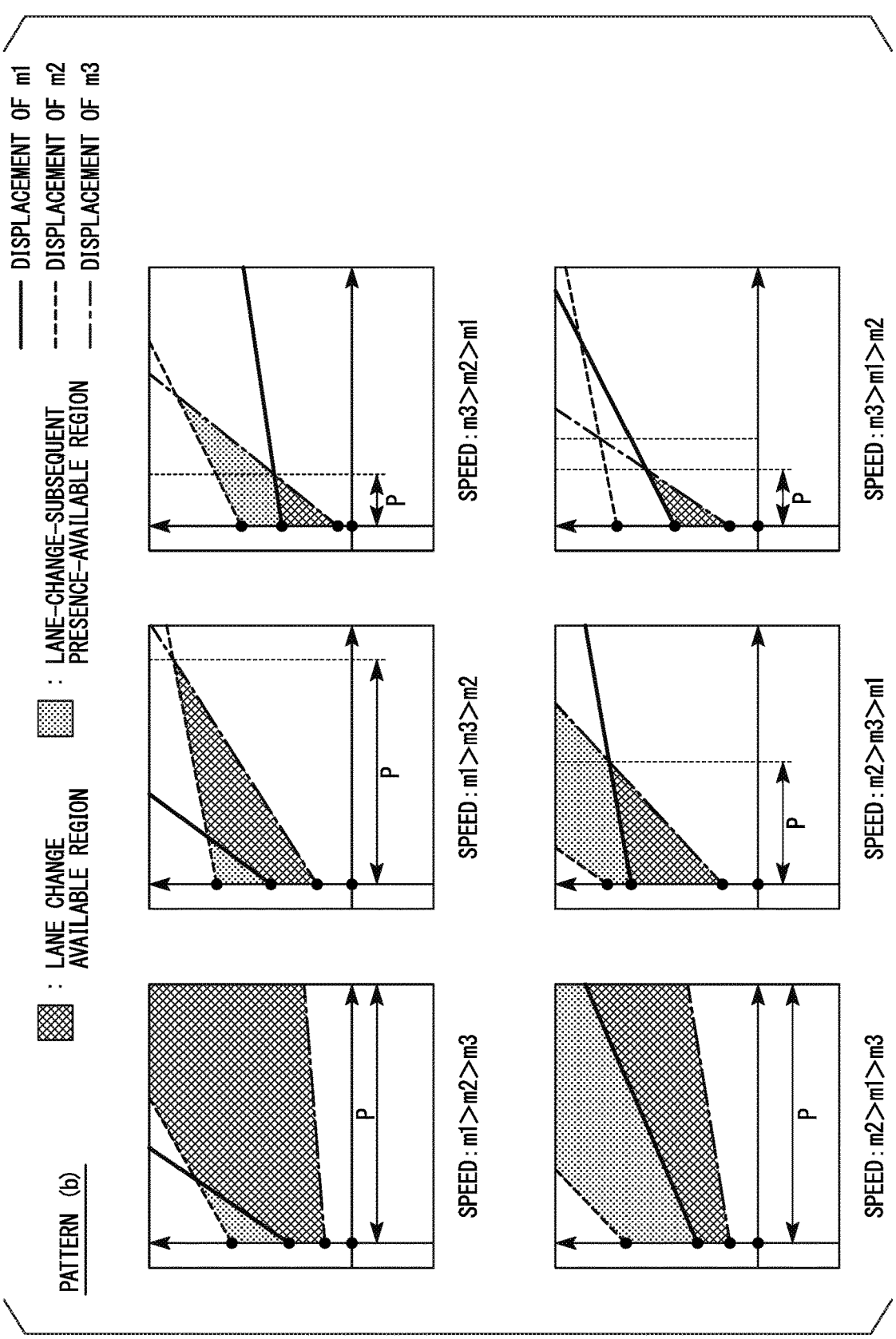
FIG. 15 is a view showing patterns into which the position change of the peripheral vehicle is categorized with respect to Pattern (b) of the vehicle positional relationship.

FIG. 14 is a view showing patterns into which the position change of the peripheral vehicle is categorized with respect to Pattern (a) of the vehicle positional relationship. FIG. 15 is a view showing patterns into which the position change of the peripheral vehicle is categorized with respect to Pattern (b) of the vehicle positional relationship. The vertical axis in FIG. 14 and FIG. 15 represents a displacement with respect to the proceeding direction with reference to the vehicle M, and the horizontal axis represents an elapsed time. A lane-change-subsequent presence-available region in FIG. 14 and FIG. 15 shows a displacement region in which the vehicle M is capable of being present after performing a lane change when the peripheral vehicle (m1, m2, m3) that becomes the determination target keeps traveling in the same trend. For example, a drawing indicated by "speed: m2>m1>m3" in FIG. 14 shows that the lane change available region is on a more lower side than the displacement of the frontward traveling vehicle m1, that is, although the vehicle M is restricted so as not to be a more frontward position than the frontward traveling vehicle m1 before performing a lane change, it is no problem for the vehicle M to be a more frontward position than the frontward traveling vehicle m1 after performing a lane change. The lane-change-subsequent presence-available region is used for the process of the travel trajectory generation part 115. The pattern in which the vehicle positional relationship is categorized may be, for example, a positional relationship such as "m2-m1-M-m3" and "m1-M-m2-m3" in addition to Patterns (a), (b) described above or may be categorized depending on the number of vehicles. In the example described above, the pattern that represents the vehicle positional relationship is categorized into six patterns.

When any one or more vehicles of the frontward traveling vehicle, the lane-change target-position candidate frontward-traveling vehicle, and the lane-change target-position candidate rearward-traveling vehicle are not recognized by the outside recognition unit 104, and a virtual vehicle is set in the process of Step S102 described above, the another vehicle position change estimation part 114 estimates a future position change with respect to the frontward traveling vehicle, the lane-change target-position candidate frontward-traveling vehicle, or the lane-change target-position candidate rearward-traveling vehicle that are recognized by the outside recognition unit 104 and the virtual vehicle that is set by the virtual vehicle setting part 113 in response to being not recognized (Step S106).

For example, when the lane-change target-position candidate frontward-traveling vehicle and the lane-change target-position candidate rearward-traveling vehicle are recognized, and the frontward traveling vehicle is not recognized, the another vehicle position change estimation part 114 estimates a future position change with respect to the lane-change target-position candidate frontward-traveling vehicle and the lane-change target-position candidate rearward-traveling vehicle that are recognized and a virtual vehicle that virtually simulates the unrecognized frontward traveling vehicle.

Figure 16:
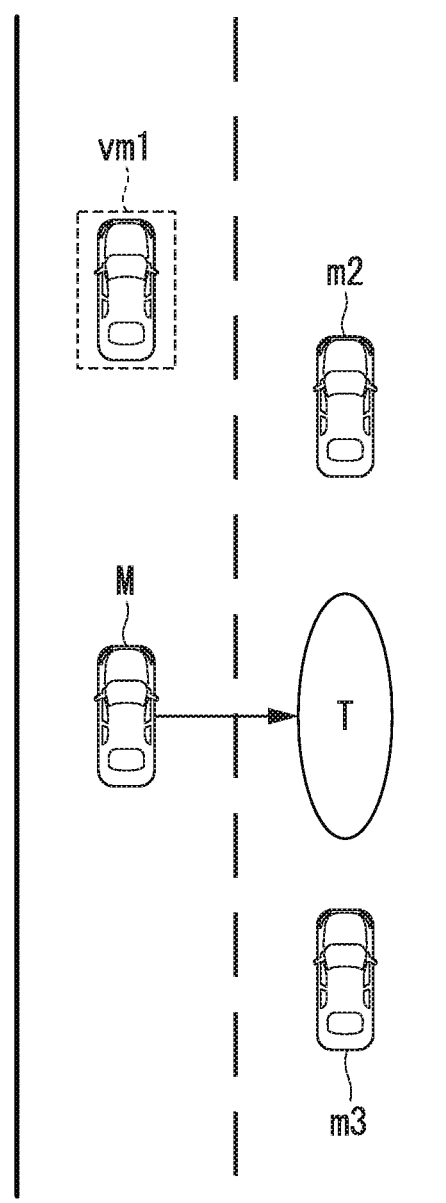
FIG. 16 is a view showing an example of, in a case where part of a peripheral vehicle that becomes a determination target is not recognized, a positional relationship between the vehicle and the peripheral vehicle.

FIG. 16 is a view showing an example of, in a case where part of a peripheral vehicle that becomes a determination target is not recognized, a positional relationship between the vehicle M and the peripheral vehicle. In the example of FIG. 16, a frontward traveling vehicle m1 is not recognized, and a virtual vehicle vm1 that virtually simulates the frontward traveling vehicle m1 is set. Hereinafter, a vehicle positional relationship when a virtual vehicle vm1 is set is described as Pattern (c). For example, Pattern (c) represents a positional relationship of vm1-m2-M-m3 in the order from the vehicle proceeding direction and shows an example in which the vehicle M changes the lane without changing the relative position with the peripheral vehicle.

Figure 17:
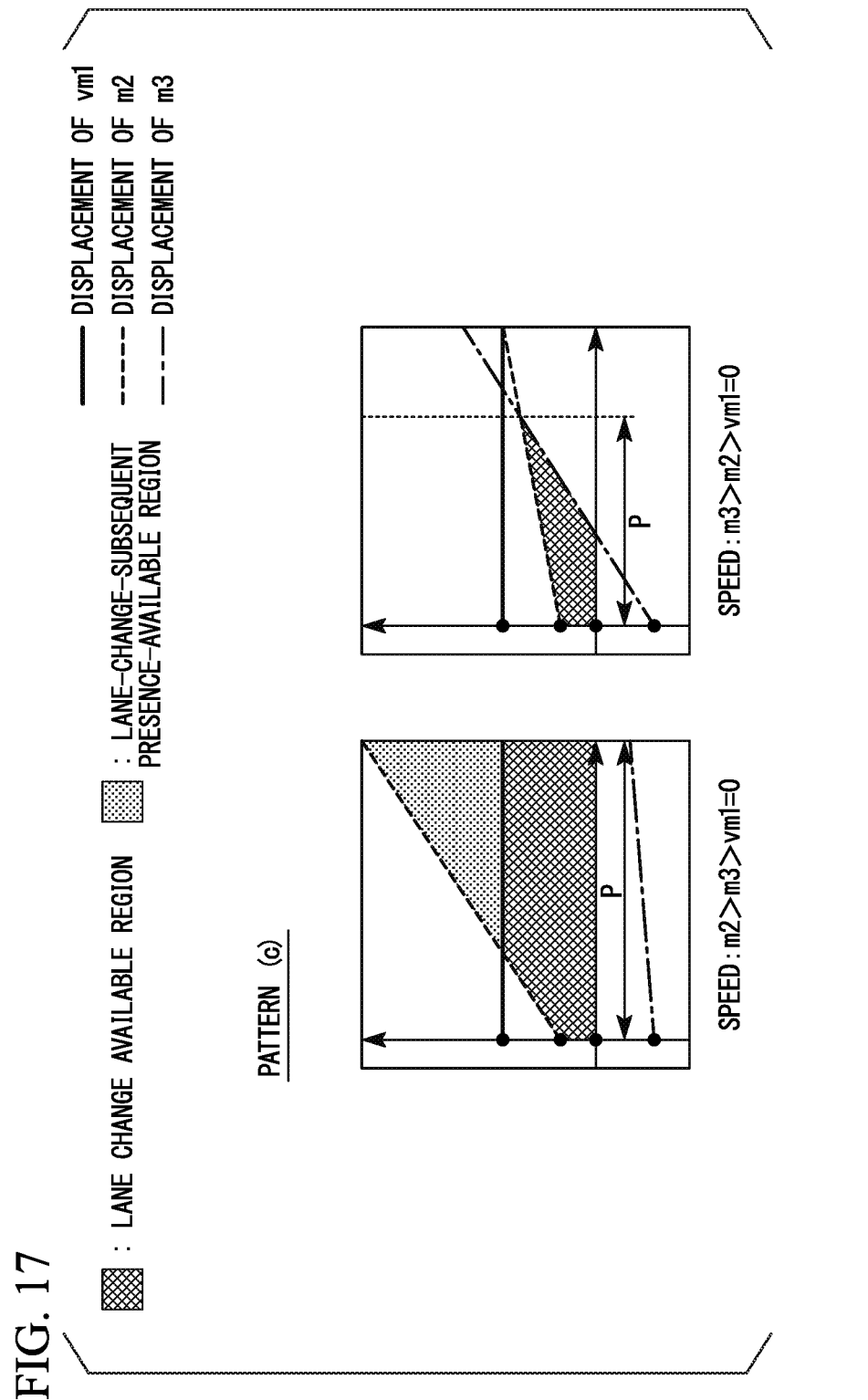
FIG. 17 is a view showing patterns into which the position change of the peripheral vehicle is categorized with respect to Pattern (c) of the vehicle positional relationship.

In the case of the positional relationship of Pattern (c), the another vehicle position change estimation part 114 categorizes the future position change according to speed models of the virtual vehicle vm1, the lane-change target-position candidate frontward-traveling vehicle m2, and the lane-change target-position candidate rearward-traveling vehicle m3. FIG. 17 is a view showing patterns into which the position change of the peripheral vehicle is categorized with respect to Pattern (c) of the vehicle positional relationship. The vertical axis in FIG. 17 represents a displacement with respect to the proceeding direction with reference to the vehicle M, and the horizontal axis represents an elapsed time, similarly to FIG. 14 and FIG. 15. In the example of FIG. 17, the future position change is estimated using a model in which the virtual vehicle vm1 is assumed to be a stationary body having a speed of zero.

When all of the frontward traveling vehicle, the lane-change target-position candidate frontward-traveling vehicle, and the lane-change target-position candidate rearward-traveling vehicle are not recognized by the outside recognition unit 104, the another vehicle position change estimation part 114 estimates a future position change with respect to virtual vehicles that correspond to all of these peripheral vehicles. In such a case, the another vehicle position change estimation part 114 estimates a future position change according to a speed model in accordance with the speed of each virtual vehicle that is set by the virtual vehicle setting part 113.

The vehicle that is taken into consideration is not limited to the frontward traveling vehicle, the lane-change target-position candidate frontward-traveling vehicle, and the lane-change target-position candidate rearward-traveling vehicle described above; and, for example, the another vehicle position change estimation part 114 may take a vehicle that is traveling on the travel lane and that is different from the above-described frontward traveling vehicle or a vehicle that is traveling on the adjacent lane and that is different from the above-described lane-change target-position candidate frontward-traveling vehicle and the above-described lane-change target-position candidate rearward-traveling vehicle into consideration and estimate a future position change. The another vehicle position change estimation part 114 may take a peripheral vehicle that is traveling on a further adjacent lane of the adjacent lane and estimate a future position change.

Next, the travel trajectory generation part 115 generates a travel trajectory for a lane change according to the position change of the peripheral vehicle that is estimated by the another vehicle position change estimation part 114 for each lane change target position candidate T that is set by the target position candidate setting part 111 (Step S108).

The process of Step S108 is described. In the following description, an example of a speed relationship of m1>m3>m2 in Pattern (b) of the above-described vehicle positional relationship is described. For example, the travel trajectory generation part 115 determines a start time point and an end time point of a lane change according to the position change of the peripheral vehicle that is estimated by the another vehicle position change estimation part 114 and determines the speed of the vehicle M such that a lane change is performed in a period (lane change available period P) from the start time point to the end time point. In order to determine the start time point of the lane change, a parameter such as "a time point when the vehicle M overtakes the lane-change target-position candidate rearward-traveling vehicle m3" is present, and in order to obtain this, an assumption regarding the acceleration or deceleration of the vehicle M is required. With respect to this point, for example, if accelerating, the travel trajectory generation part 115 derives a speed change curve using the legal speed as the upper limit in a range where the acceleration from the current speed of the vehicle M does not become an abrupt acceleration and determines "the time point when the vehicle M overtakes the lane-change target-position candidate rearward-traveling vehicle m3" by using the derived speed change curve together with the position change of the lane-change target-position candidate rearward-traveling vehicle m3. Thereby, the travel trajectory generation part 115 determines the start time point of the lane change.

In order to determine the end time point of the lane change, the travel trajectory generation part 115 determines as the end time point, for example, when the lane-change target-position candidate rearward-traveling vehicle m3 catches up with the lane-change target-position candidate frontward-traveling vehicle m2, and the distance between the lane-change target-position candidate rearward-traveling vehicle m3 and the lane-change target-position candidate frontward-traveling vehicle m2 becomes a predetermined distance. In this way, the travel trajectory generation part 115 determines the start time point and the end time point of the lane change and thereby derives the lane change available period P.

Figure 18:
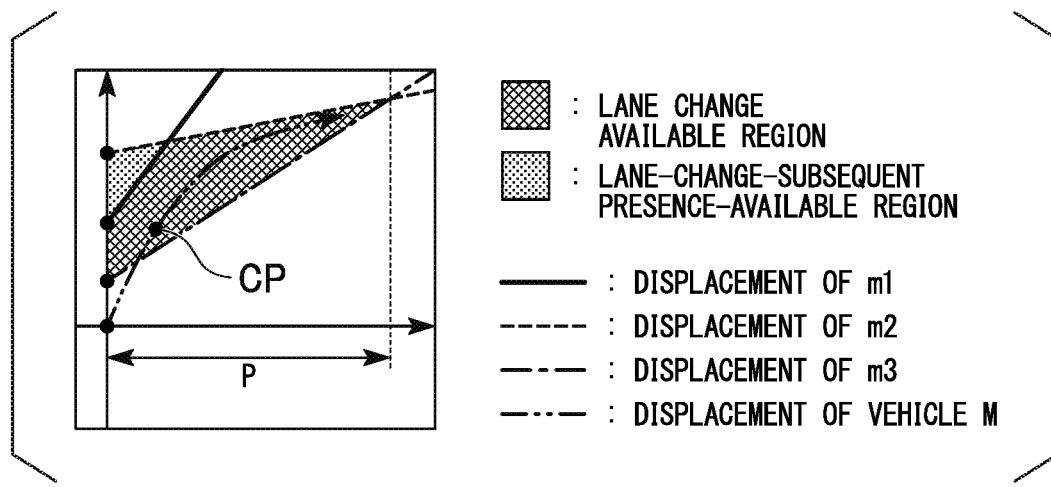
FIG. 18 is a view showing an example of a travel trajectory used for a lane change that is generated by a travel trajectory generation part.

The travel trajectory generation part 115 obtains a limitation of the speed of the vehicle M at which the vehicle M is capable of entering the lane change available region in the derived lane change available period P and generates a travel trajectory used for the lane change in accordance with the limitation of the speed. FIG. 18 is a view showing an example of the travel trajectory used for the lane change that is generated by the travel trajectory generation part 115. The vertical axis in FIG. 18 represents a displacement with respect to the proceeding direction with reference to the vehicle M, and the horizontal axis represents an elapsed time. The frontward traveling vehicle is represented by "m1", the lane-change target-position candidate frontward-traveling vehicle is represented by "m2", and the lane-change target-position candidate rearward-traveling vehicle is represented by "m3". In the example of FIG. 18, the lane change available region is a region that is smaller than the displacement of both the frontward traveling vehicle m1 and the lane-change target-position candidate frontward-traveling vehicle m2 and that is larger than the displacement of the lane-change target-position candidate rearward-traveling vehicle m3. That is, the limitation of the speed of the vehicle M is set in a speed range in which the vehicle M does not catch up with the frontward traveling vehicle m1 and overtakes the lane-change target-position candidate rearward-traveling vehicle m3 in the period (lane change available period P) until the lane-change target-position candidate rearward-traveling vehicle m3 catches up with the lane-change target-position candidate frontward-traveling vehicle m2.

The limitation of the speed of the vehicle M may include traveling so as to follow up the lane-change target-position candidate frontward-traveling vehicle m2 which becomes a frontward traveling vehicle after the lane change (in a state of being located at a position between the lane-change target-position candidate frontward-traveling vehicle m2 and the lane-change target-position candidate rearward-traveling vehicle m3).

In this case, at a time point when the follow-up travel is started, the vehicle M may be deviated from the lane change available region and enter a lane-change-subsequent presence-available region. As shown in FIG. 18, the lane-change-subsequent presence-available region is a region in which the displacement of the frontward traveling vehicle m1 is smaller than the displacement of the lane-change target-position candidate frontward-traveling vehicle m2. That is, entering the lane-change-subsequent presence-available region from the lane change available region represents a transition from when maintaining a state in which the vehicle M does not come to a more frontward position than the frontward traveling vehicle m1 according to the limitation of the speed described above before performing the lane change to a state the vehicle M comes to a more frontward position than the frontward traveling vehicle m1 after performing the lane change.

Further, when it is necessary to perform a lane change after the vehicle M overtakes the lane-change target-position candidate rearward-traveling vehicle m3, the travel trajectory generation part 115 sets the limitation of the speed of the vehicle M such that the lane change is started at a point (for example, CP in the drawing) where the displacement of the vehicle M is sufficiently larger than the displacement of the lane-change target-position candidate rearward-traveling vehicle m3. The travel trajectory generation part 115 draws a trajectory (track) that represents the change of the displacement of the vehicle M indicated in the drawing such that the limitation of the speed that is set in this way is satisfied and derives the trajectory as a travel trajectory. The travel trajectory generation part 115 may generate, for example, a travel trajectory by which a frontward traveling vehicle is followed up at a speed at which the relative position to the frontward traveling vehicle is constant.

The lane change control unit 110 determines whether or not the process of Step S100 to S108 is performed with respect to all of the lane change target position candidates T (Step S110). When the process of Steps S100 to S108 is not performed with respect to all of the lane change target position candidates T, the routine returns to Step S100, the next lane change target position candidate T is selected to perform the subsequent process.

When the process of Steps S100 to S108 is performed with respect to all of the lane change target position candidates T, the target position determination part 116 evaluates corresponding travel trajectories and thereby determines the lane change target position T# (Step S112).

The target position determination part 116 determines the lane change target position T#, for example, from the viewpoint of safety or efficiency. The target position determination part 116 refers to the travel trajectory that corresponds to each of the lane change target position candidates T and preferentially selects one in which the spacing with the frontward and rearward vehicles at the time of the lane change is large, one in which the speed is close to the legal speed, one in which acceleration or deceleration that is required at the time of the lane change is small, or the like as the lane change target position T#. In this way, one lane change target position T# and one travel trajectory are determined.

According to the process sequence described above, the process of the present flowchart is finished.

Travel Control

The travel control part 120 sets a control mode to an automated driving mode or a manual driving mode according to a control by the control switch unit 122 and controls a control target that includes part of or all of the travel drive force output device 72, the steering device 74, and the brake device 76 in accordance with the set control mode. The travel control part 120 reads the action plan information 136 that is generated by the action plan generation unit 106 at the automated driving mode and controls the control target according to the event that is included in the read action plan information 136. When the event is a lane change event, the travel control part 120 determines the control amount (for example, a rotation number) of the electric motor in a steering device 92 and the control amount (for example, a throttle opening degree of an engine, a shift step, and the like) of the ECU in a travel drive force output device 90 in accordance with the travel trajectory that is generated by the travel trajectory generation part 115. The travel control part 120 outputs information indicating the control amount that is determined for each event to the corresponding control target. Thereby, each device (72, 74, 76) as a control target can control the device as the control target in accordance with the information indicating the control amount that is input from the travel control part 120.

Further, the travel control part 120 appropriately adjusts the determined control amount according to a detection result of the vehicle sensor 60.

The travel control part 120 controls the control target according to an operation detection signal that is output by the operation detection sensor 80 at the manual driving mode. For example, the travel control part 120 outputs the operation detection signal that is output by the operation detection sensor 80 as is to each device as the control target.

The control switch unit 122 switches the control mode of the vehicle M by the travel control part 120 from the automated driving mode to the manual driving mode or from the manual driving mode to the automated driving mode according to the action plan information 136 that is generated by the action plan generation unit 106 and that is stored in the storage part 130. The control switch unit 122 switches the control mode of the vehicle M by the travel control part 120 from the automated driving mode to the manual driving mode or from the manual driving mode to the automated driving mode according to the control mode designation signal that is input from the switch 82. That is, the control mode of the travel control part 120 can be arbitrarily changed while traveling or stopping by the operation of the driver or the like.

The control switch unit 122 switches the control mode of the vehicle M by the travel control part 120 from the automated driving mode to the manual driving mode according to the operation detection signal that is input from the operation detection sensor 80. For example, the control switch unit 122 switches the control mode of the travel control part 120 from the automated driving mode to the manual driving mode when the operation amount that is included in the operation detection signal exceeds a threshold value, that is, when an operation device 70 accepts an operation by the operation amount that exceeds the threshold value. For example, the control switch unit 122 switches the control mode of the travel control part 120 from the automated driving mode to the manual driving mode when the steering wheel, the accelerator pedal, or the brake pedal is operated by the operation amount that exceeds the threshold value by the driver in a case where the vehicle M is automatically traveling by the travel control part 120 that is set in the automated driving mode. Thereby, the vehicle control apparatus 100 can switch the driving mode to the manual driving mode immediately via no operation of the switch 82 by an operation that is abruptly performed by the driver when an object such as a person dashes out to the road or when a frontward traveling vehicle suddenly stops. As a result, the vehicle control apparatus 100 can respond to an operation in an emergency by the driver, and it is possible to enhance safety when traveling.

According to the vehicle control apparatus 100, the vehicle control method, and the vehicle control program in the first embodiment described above, the virtual vehicle setting part 113 generates a travel trajectory of a vehicle according to a peripheral vehicle that satisfies a predetermined condition among one or more peripheral vehicles that are detected by the detection part DT, and when it is not possible to detect the peripheral vehicle that satisfies the predetermined condition, a virtual vehicle which virtually simulates the peripheral vehicle that satisfies the predetermined condition is set, and the travel trajectory of the vehicle is generated. Thereby, even when it is not possible to detect the peripheral vehicle that satisfies the predetermined condition by the detection part DT, it is possible to accurately estimate the future position change of the peripheral vehicle at the time of a lane change. Thereby, in the vehicle control apparatus 100 in the first embodiment, the travel control part 120 can accurately control acceleration, deceleration, or steering of the vehicle according to one or both of the virtual vehicle that is set by the virtual vehicle setting part 113 and the peripheral vehicle that is detected by the detection part DT. As a result, it is possible for the vehicle control apparatus 100 in the first embodiment to perform further flexible automated driving.

Further, according to the vehicle control apparatus 100, the vehicle control method, and the vehicle control program in the first embodiment, any one or more vehicles among the frontward traveling vehicle, the lane-change target-position candidate frontward-traveling vehicle, and the lane-change target-position candidate rearward-traveling vehicle are focused on to perform the lane change, and therefore, it is possible to reduce the cost of calculating the state estimation of the peripheral vehicle which is performed when performing automated driving.

Further, according to the vehicle control apparatus 100, the vehicle control method, and the vehicle control program in the first embodiment, the virtual vehicle that is set in the frontward direction of the vehicle M is a stationary body, or the virtual vehicle that is set in the rearward direction of the vehicle M is a movable body. Therefore, it is possible to perform automated driving further safely.

Second Embodiment

Hereinafter, a second embodiment is described. A vehicle control apparatus 100 in the second embodiment is different from the vehicle control apparatus 100 of the first embodiment in that when a disappearance region or an appearance region of a lane is detected by the detection part DT, a virtual vehicle is set. Hereinafter, such a difference is mainly described.

A detection part DT in the second embodiment is a combination of the finder 20, the radar 30, the camera 40, the outside recognition unit 104, and the navigation device 50. The detection part DT in the second embodiment detects a disappearance region or an appearance region of a lane according to one or both of the detection result of a device and the map information 132 that is stored in the storage unit 130. More specifically, the outside recognition unit 104 that is included in the detection part DT recognizes a disappearance region or an appearance region of a lane according to one or both of the detection result of a device and the map information 132 that is stored in the storage unit 130. For example, the disappearance region of a lane is a lane merging point, and the appearance region of a lane is a lane branching point. In the following description, the disappearance region or the appearance region of a lane being recognized by the outside recognition unit 104 is described as the disappearance region or the appearance region of a lane being detected by the detection part DT. The detection part DT in the second embodiment is an example of a "second detection part".

In the second embodiment, the determination part 112 determines whether or not the disappearance region or the appearance region of a lane is detected by the detection part DT.

Figure 19:
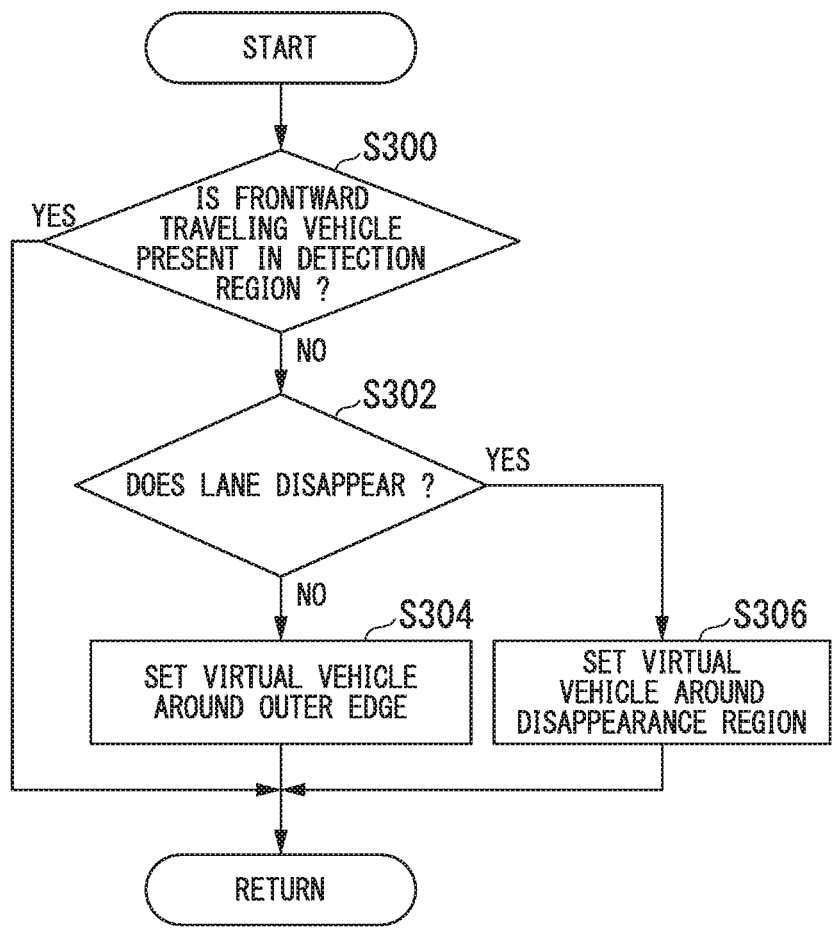
FIG. 19 is a flowchart showing an example of a process flow of a lane change control part in a second embodiment.

Hereinafter, a case in which a disappearance region of a lane is detected is described. FIG. 19 is a flowchart showing an example of a process flow of a lane change control part 110 in the second embodiment. For example, the lane change control part 110 sets a virtual vehicle when a disappearance region of a lane is present in accordance with the process of the present flowchart. The process of the present flowchart corresponds to the process of Step S200 and S202 in FIG. 7 described above.

First, the determination part 112 determines whether or not a frontward traveling vehicle is present in the detection region DR, that is, whether or not a frontward traveling vehicle is recognized by the outside recognition unit 104 (Step S300).

The lane change control unit 110 finishes the process of the present flowchart when a frontward traveling vehicle is present in the detection region DR.

On the other hand, when a frontward traveling vehicle is not present in the detection region DR, the determination part 112 determines whether or not the disappearance region of a lane is detected in the detection region DR (Step S302). When the disappearance region of a lane is not detected in the detection region DR, the virtual vehicle setting part 113 sets a virtual vehicle which virtually simulates a frontward traveling vehicle in the vicinity of the outer edge of the detection region DR, similarly to the first embodiment described above (Step S304).

On the other hand, when the disappearance region of a lane is detected in the detection region DR, the virtual vehicle setting part 113 sets a virtual vehicle which virtually simulates a frontward traveling vehicle in the vicinity of the disappearance region of the lane (Step S306).

Figure 20:
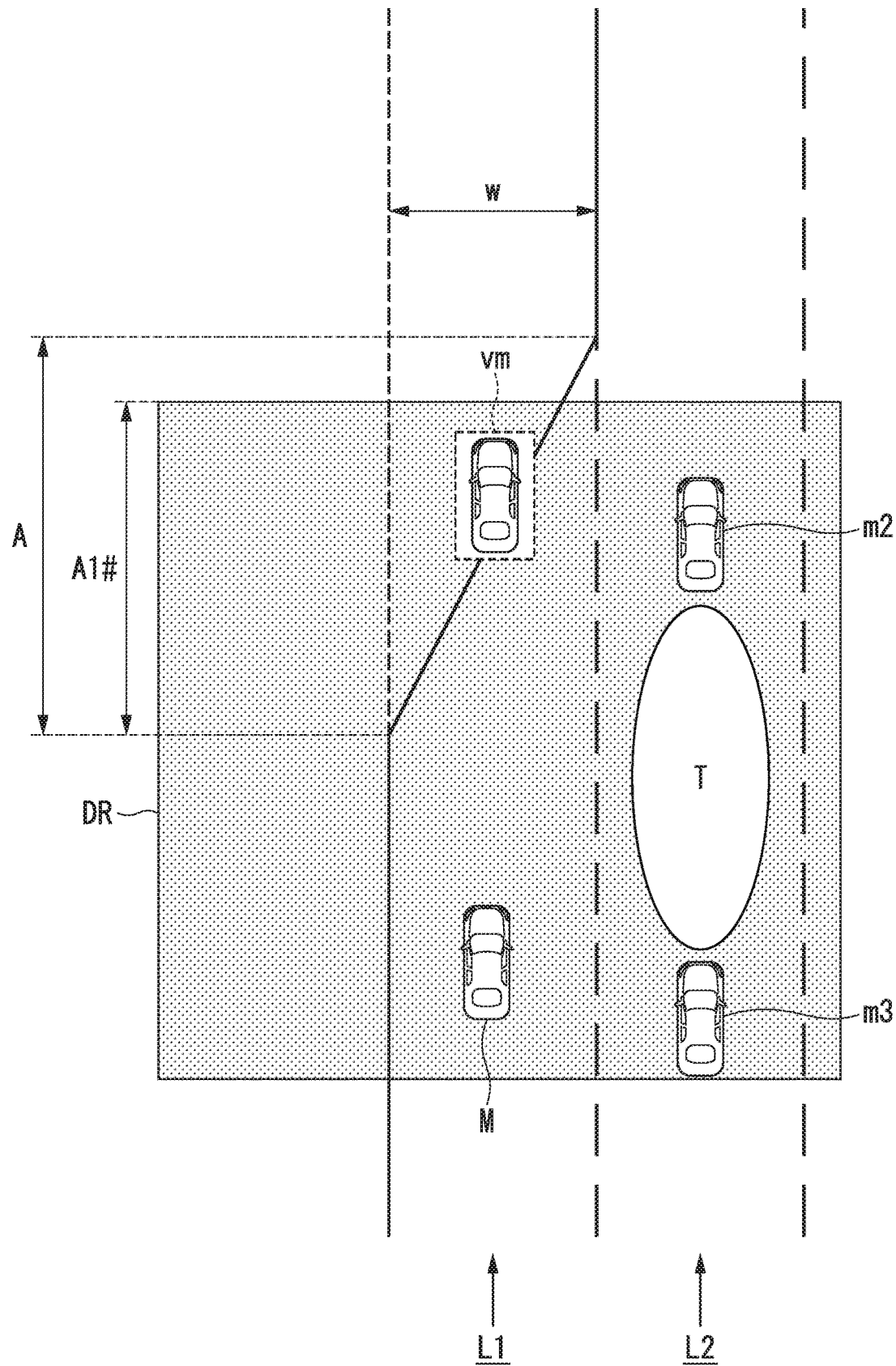
FIG. 20 is a view showing an example of a scene in which a disappearance region of a lane is detected in a detection region.

FIG. 20 is a view showing an example of a scene in which a disappearance region of a lane is detected in a detection region DR. In the example of FIG. 20, a peripheral vehicle m2 is recognized as the lane-change target-position candidate frontward-traveling vehicle, and a peripheral vehicle m3 is recognized as the lane-change target-position candidate rearward-traveling vehicle. A frontward traveling vehicle is not recognized, and the lane disappears on the travel lane L1. In such a case, the virtual vehicle setting part 113 sets a virtual vehicle vm in a region in which a width W of the travel lane L1 is narrowed in the detection region DR. More specifically, the virtual vehicle setting part 113 sets the virtual vehicle vm in a range A1 from a position at which the width W of the travel lane L1 starts to be reduced to a position at which the lane completely disappears. When an outer edge of the detection region DR is included in the range A1, the virtual vehicle setting part 113 sets the virtual vehicle vm in a range A1# from a position at which the width W of the travel lane L1 starts to be reduced to the outer edge of the detection region DR. The virtual vehicle setting part 113 sets the virtual vehicle vm as a stationary body (speed of zero) in the present embodiment. The virtual vehicle setting part 113 may set a vehicle having a speed (or acceleration) that is equal to or less than a threshold value as the virtual vehicle vm, similarly to the first embodiment described above.

Thereby, the process of the present flowchart is finished. As a result, the another vehicle position change estimation part 114 estimates a future position change, for example, with respect to the recognized lane-change target-position candidate frontward-traveling vehicle m2, the recognized lane-change target-position candidate rearward-traveling vehicle m3, and the virtual vehicle vm which virtually simulates the frontward traveling vehicle and which is set in the vicinity of the disappearance region of the lane.

Figure 21:
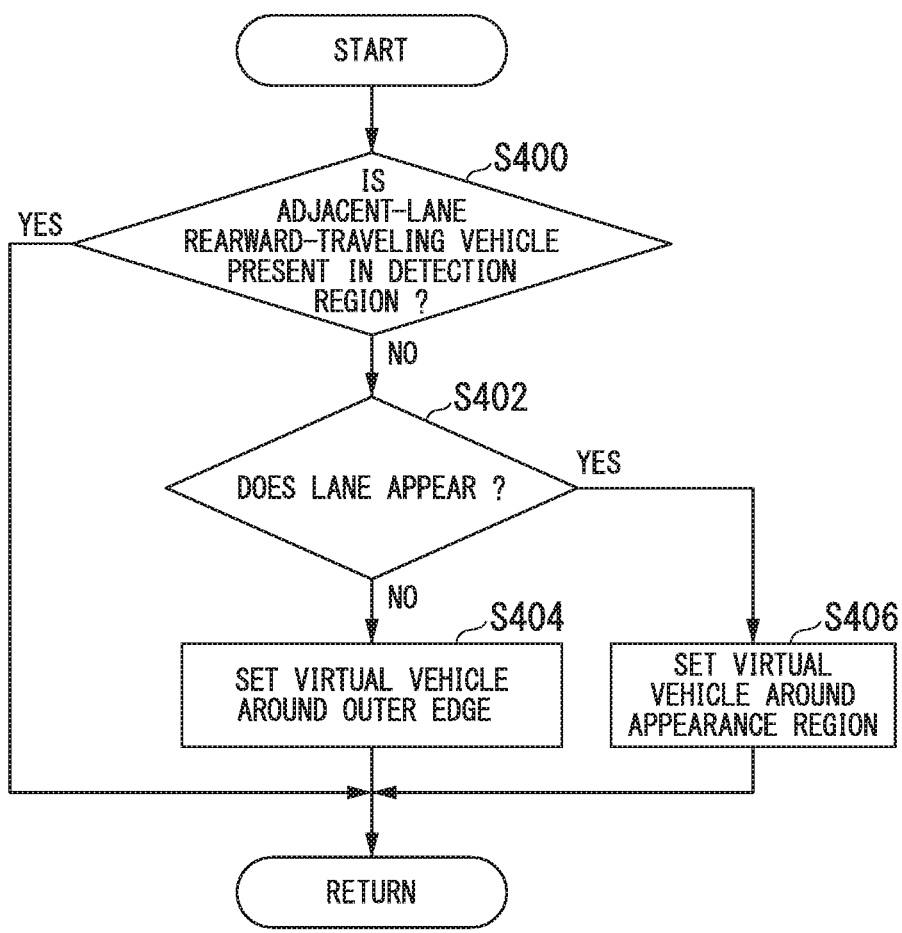
FIG. 21 is a flowchart showing another example of the process flow of the lane change control part in the second embodiment.

Hereinafter, a case in which an appearance region of a lane is detected is described. FIG. 21 is a flowchart showing another example of the process flow of the lane change control part 110 in the second embodiment. For example, the lane change control part 110 sets a virtual vehicle when an appearance region of a lane is present in accordance with the process of the present flowchart. The process of the present flowchart corresponds to the process of Step S208 and S210 in FIG. 7 described above.

First, the determination part 112 determines whether or not a lane-change target-position candidate rearward-traveling vehicle is present in the detection region DR, that is, whether or not a lane-change target-position candidate rearward-traveling vehicle is recognized by the outside recognition unit 104 (Step S400). The lane change control unit 110 finishes the process of the present flowchart when a lane-change target-position candidate rearward-traveling vehicle is present in the detection region DR.

On the other hand, when a lane-change target-position candidate rearward-traveling vehicle is not present in the detection region DR, the determination part 112 determines whether or not the appearance region of a lane is detected in the detection region DR (Step S402). When the appearance region of a lane is not detected in the detection region DR, the virtual vehicle setting part 113 sets a virtual vehicle which virtually simulates a lane-change target-position candidate rearward-traveling vehicle in the vicinity of the outer edge of the detection region DR, similarly to the first embodiment described above (Step S404).

On the other hand, when the appearance region of a lane is detected in the detection region DR, the virtual vehicle setting part 113 sets a virtual vehicle which virtually simulates a lane-change target-position candidate rearward-traveling vehicle in the vicinity of the appearance region of the lane (Step S406).

Figure 22:
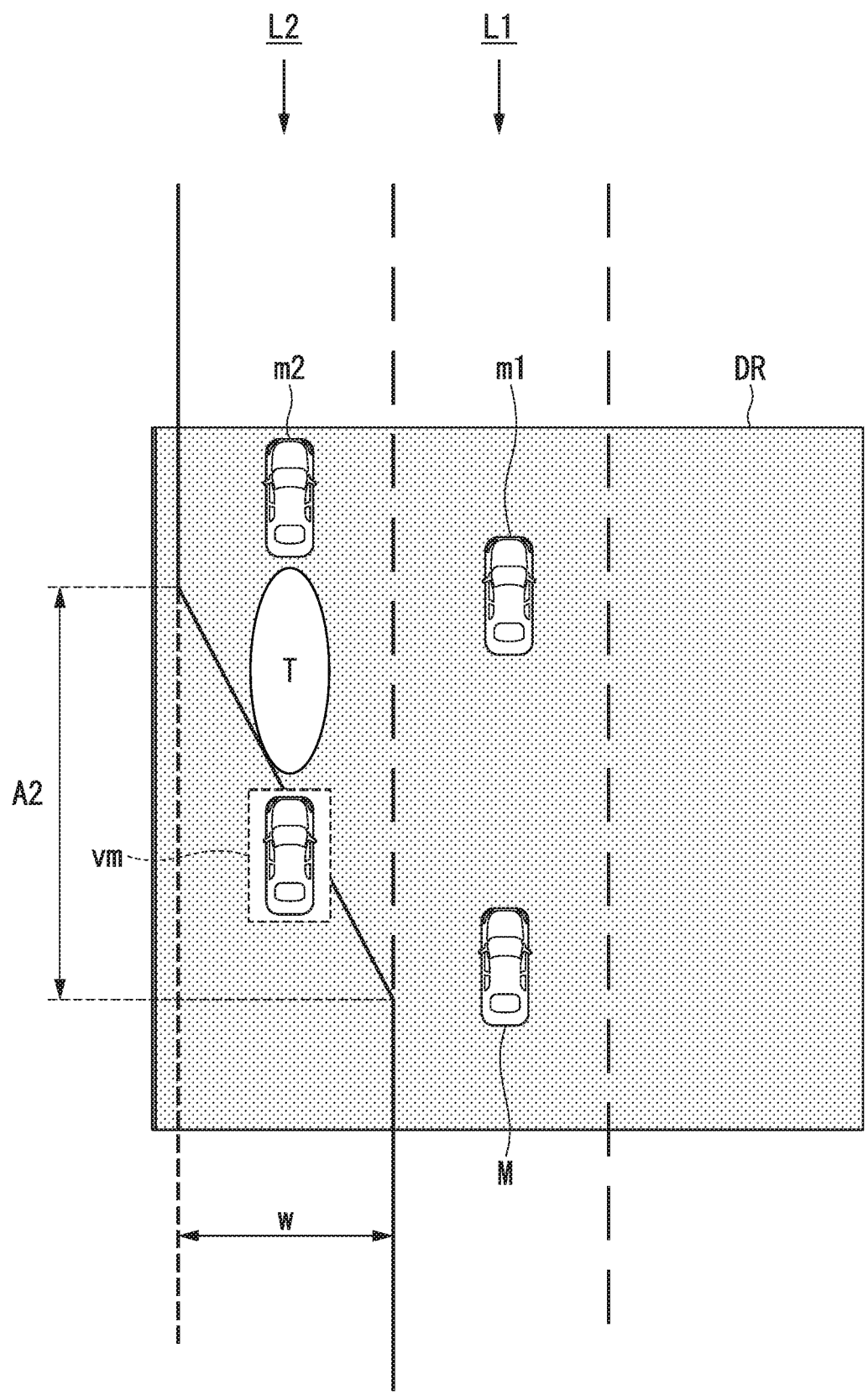
FIG. 22 is a view showing an example of a scene in which an appearance region of a lane is detected in the detection region.

FIG. 22 is a view showing an example of a scene in which an appearance region of a lane is detected in a detection region DR. In the example of FIG. 22, a peripheral vehicle m1 is recognized as the frontward traveling vehicle, and a peripheral vehicle m2 is recognized as a lane-change target-position candidate frontward-traveling vehicle. An adjacent lane L2 appears from a point of the travel lane L1. A vehicle is not present before the lane appears, and therefore, a lane-change target-position candidate rearward-traveling vehicle is not recognized. In such a case, the virtual vehicle setting part 113 sets a virtual vehicle vm in a region in which a width W of the adjacent lane L2 is broadened in the detection region DR. More specifically, the virtual vehicle setting part 113 sets the virtual vehicle vm in a range A2 from a position at which the width W of the adjacent lane L2 starts to be enlarged to a position at which the lane completely appears. At this time, the virtual vehicle setting part 113 sets the virtual vehicle vm as a movable body.

Thereby, the process of the present flowchart is finished. As a result, the another vehicle position change estimation part 114 estimates a future position change, for example, with respect to the recognized frontward traveling vehicle m1, the recognized lane-change target-position candidate frontward-traveling vehicle m2, and the virtual vehicle vm which virtually simulates the lane-change target-position candidate rearward-traveling vehicle and which is set in the vicinity of the appearance region of the lane.

According to the vehicle control apparatus 100, the vehicle control method, and the vehicle control program in the second embodiment described above, when a disappearance region of a lane or an appearance region of a lane is present, the virtual vehicle is set, and thereby, it is possible to perform further flexible automated driving in response to the travel lane.

Further, according to the vehicle control apparatus 100, the vehicle control method, and the vehicle control program in the second embodiment, in a case where the virtual vehicle that is set when the disappearance region of a lane is present is a stationary body, and the virtual vehicle that is set when the disappearance region of a lane is present is a movable body, it is possible to perform automated driving further safely.

Third Embodiment

Hereinafter, a third embodiment is described. A vehicle control apparatus 100 in the third embodiment is different from the vehicle control apparatus 100 of the first and second embodiments in that when an occlusion occurs in a detection region, the virtual vehicle is set. Hereinafter, such a difference is mainly described. The occlusion is defined as a state in which a peripheral vehicle is possibly present and cannot be detected by being hidden by another vehicle or an object.

Figure 23:
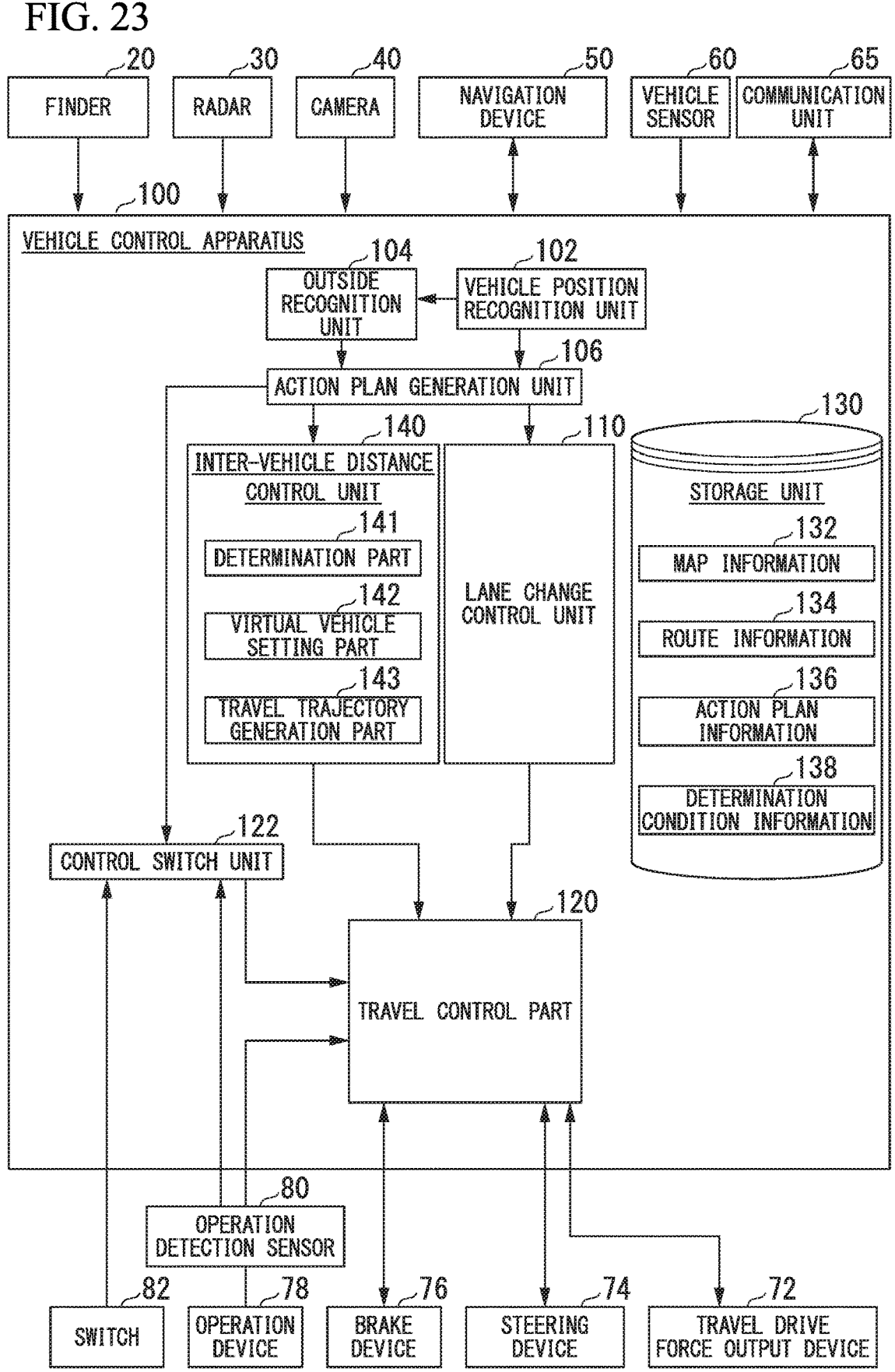
FIG. 23 is a function configuration view of a vehicle focusing on a vehicle control apparatus according to a third embodiment.

FIG. 23 is a function configuration view of the vehicle M focusing on the vehicle control apparatus 100 according to the third embodiment. A detection part DT in the third embodiment is a combination of the finder 20, the radar 30, the camera 40, the outside recognition unit 104, and the navigation device 50.

The detection part DT in the third embodiment detects an occlusion in a detection region of a device according to any one or both of the detection result of the device and the map information 132 that is stored in the storage unit 130. More specifically, the outside recognition unit 104 that is included in the detection part DT recognizes an occlusion in the detection region of the device according to one or both of the detection result of the device and the map information 132 that is stored in the storage unit 130. In the following description, an occlusion being recognized by the outside recognition unit 104 is described as an occlusion being detected by the detection part DT. The detection part DT in the third embodiment is an example of a "third detection part".

The vehicle control apparatus 100 according to the third embodiment includes an inter-vehicle distance control unit 140. The inter-vehicle distance control unit 140 includes a determination part 141, a virtual vehicle setting part 142, and a travel trajectory generation part 143. The determination part 141 determines whether or not an occlusion is detected by the detection part DT.

When the determination part 141 determines that an occlusion is detected by the detection part DT, the virtual vehicle setting part 142 sets a virtual vehicle in the vicinity of the region in which the occlusion occurs.

The travel trajectory generation part 143 assumes that a frontward traveling vehicle is traveling at a constant speed and generates a travel under a limitation of a speed at which the frontward traveling vehicle is followed up while maintaining the inter-vehicle distance with the frontward traveling vehicle to be constant.

Figure 24:
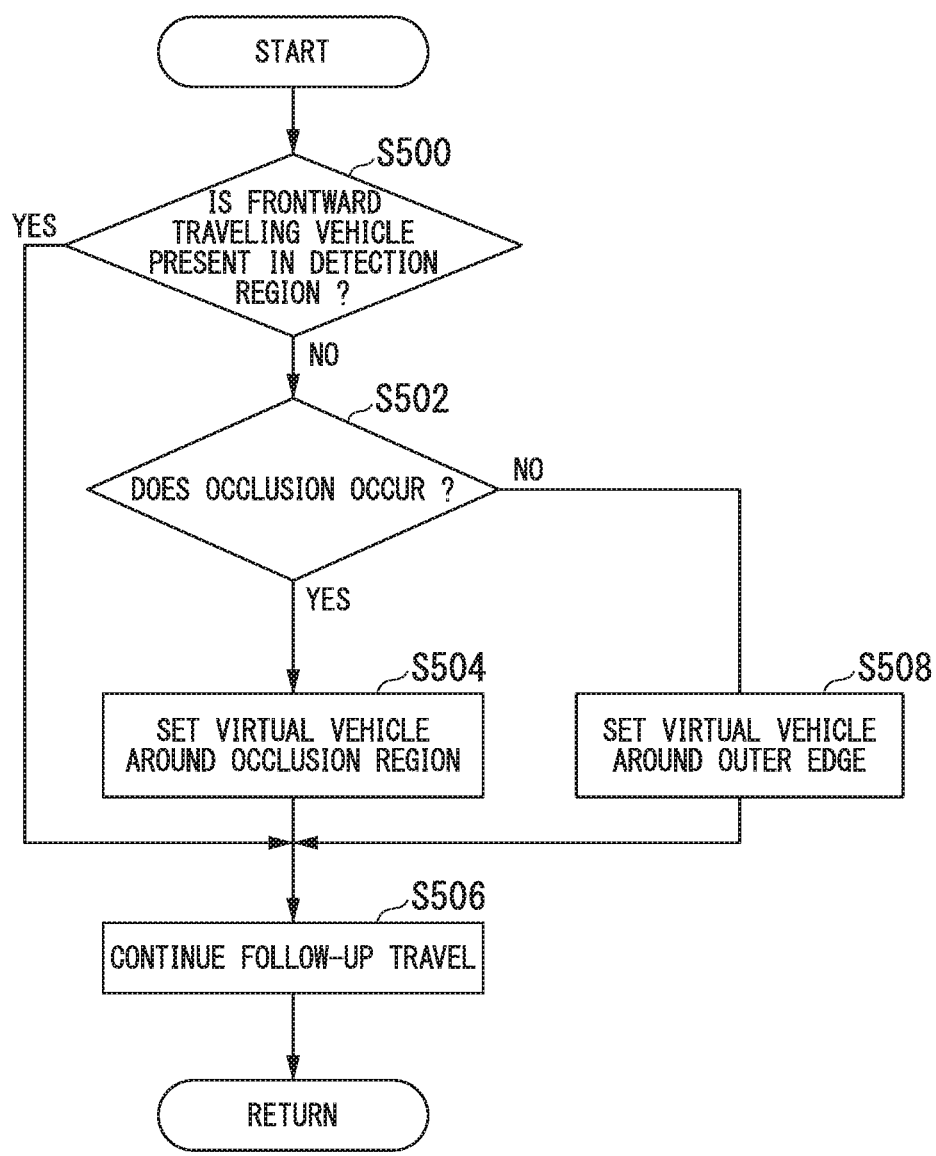
FIG. 24 is a flowchart showing an example of a process flow of an inter-vehicle distance control unit in the third embodiment.

FIG. 24 is a flowchart showing an example of a process flow of the inter-vehicle distance control unit 140 in the third embodiment. The process of the present flowchart is performed, for example, in a state where the vehicle M is controlled such that it is assumed that a frontward traveling vehicle is traveling at a constant speed, and the frontward traveling vehicle is followed up while maintaining the inter-vehicle distance with the frontward traveling vehicle to be constant. Hereinafter, such a control in which the frontward traveling vehicle is followed up is referred to as a follow-up travel.

First, the determination part 141 determines whether or not a frontward traveling vehicle is present in the detection region DR, that is, whether or not a frontward traveling vehicle is recognized by the outside recognition unit 104 (Step S500).

The inter-vehicle distance control unit 140 continues the follow-up travel when a frontward traveling vehicle is present in the detection region DR (Step S506).

On the other hand, when a frontward traveling vehicle is not present in the detection region DR, the determination part 141 determines whether or not an occlusion occurs in the detection region DR (Step S502). When an occlusion does not occur in the detection region DR, the virtual vehicle setting part 142 sets a virtual vehicle which virtually simulates a frontward traveling vehicle in the vicinity of the outer edge of the detection region DR (Step S508). Next, the inter-vehicle distance control unit 140 continues the follow-up travel such that the virtual vehicle which is set in the vicinity of the outer edge of the detection region DR is a target (Step S506).

On the other hand, when an occlusion occurs in the detection region DR, the virtual vehicle setting part 142 sets a virtual vehicle which virtually simulates a frontward traveling vehicle around the occlusion region (Step S504).

Figure 25:
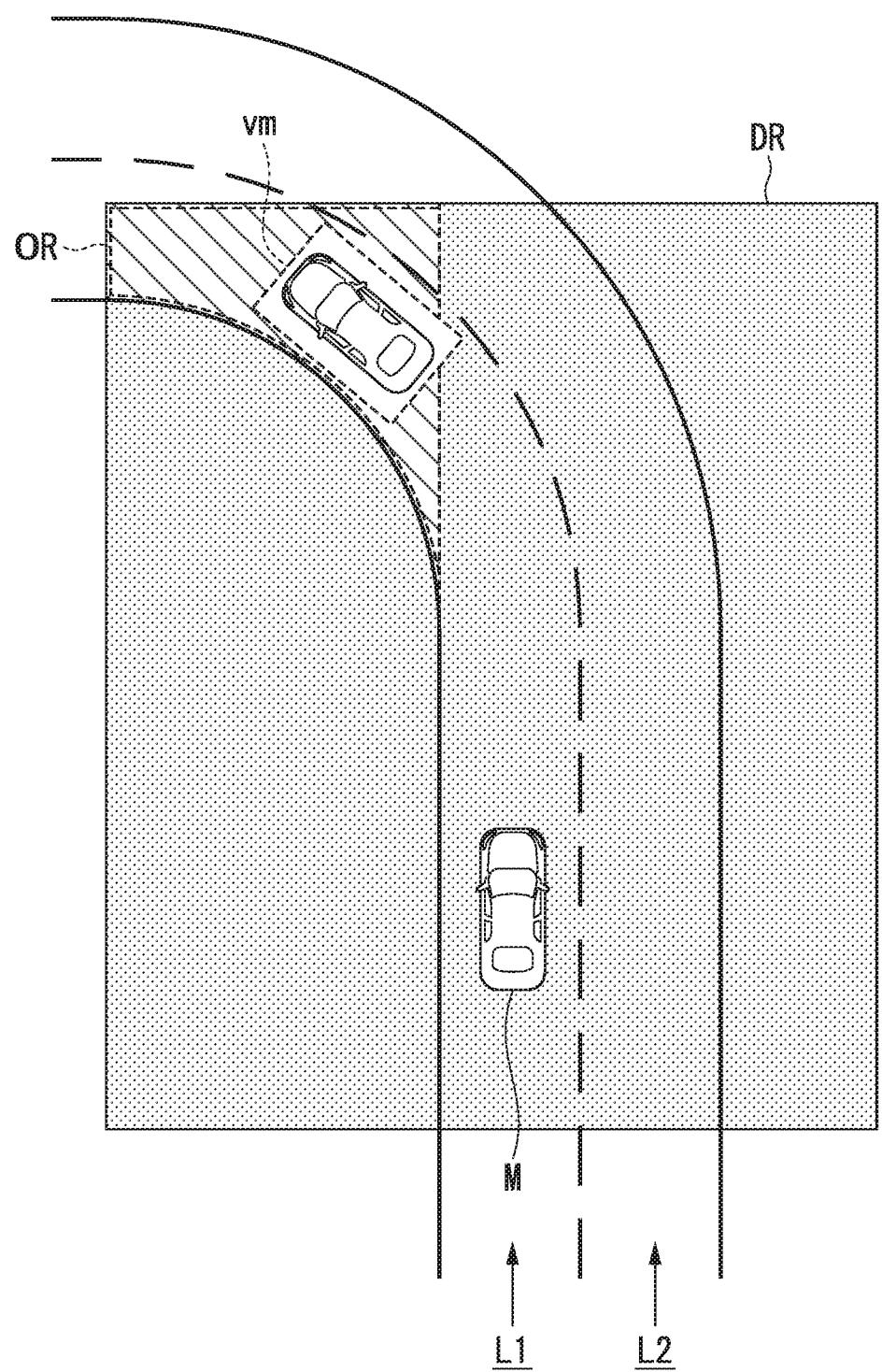
FIG. 25 is a view showing an example of a scene in which an occlusion occurs in a detection region.

FIG. 25 is a view showing an example of a scene in which an occlusion occurs in the detection region DR. In the example of FIG. 25, when a frontward traveling vehicle that is traveling on the travel lane L1 enters a curve road, light by the finder 20, electric waves by the radar 30, and the like are blocked by a screening object such as a soundproof wall that is provided on the curve road, and therefore, the subsequent vehicle M cannot recognize the frontward traveling vehicle.

In such a case, the virtual vehicle setting part 142 estimates an occlusion region OR according to the area of the detection region DR of the device and the information of the curvature of the curve of the lane, the width of each lane, and the like that are included in the map information 132. The virtual vehicle setting part 142 estimates an extension line of the travel lane L1 in accordance with the curvature of the curve and the width of the travel lane L1 in the occlusion region OR and sets a virtual vehicle vm which virtually simulates a frontward traveling vehicle on the estimated extension line of the travel lane L1. That is, when a vehicle to be detected in the detection region is screened according to the occlusion, the virtual vehicle setting part 142 sets a virtual vehicle which virtually simulates the screened vehicle. At this time, the virtual vehicle setting part 142 sets the virtual vehicle vm, for example, as a stationary body (speed of zero).

Similarly to the first and second embodiments described above, the virtual vehicle setting part 142 may set, as the virtual vehicle vm, a vehicle having a speed (or acceleration) that is equal to or less than a threshold value or a vehicle having the same speed as the vehicle M.

Next, the inter-vehicle distance control unit 140 continues the follow-up travel such that the virtual vehicle which is set around the occlusion region is a target (Step S506). Thereby, the process of the present flowchart is finished.

According to the vehicle control apparatus 100, the vehicle control method, and the vehicle control program in the third embodiment described above, when an occlusion occurs in a detection region, the virtual vehicle is set, and thereby, it is possible to perform further flexible automated driving in accordance with an environment when traveling. For example, even in a case where the vehicle control apparatus 100 in the third embodiment loses sight of a frontward traveling vehicle when performing a follow-up travel in which the frontward traveling vehicle is a target and the like, it is possible to continue performing a control for automated driving.

Further, according to the vehicle control apparatus 100, the vehicle control method, and the vehicle control program in the third embodiment, the virtual vehicle that is set when an occlusion occurs in a detection region is a stationary body, and therefore, it is possible to perform automated driving further safely.

Fourth Embodiment

Hereinafter, a fourth embodiment is described. A vehicle control apparatus 100 in the fourth embodiment is different from the vehicle control apparatus 100 of the first to third embodiments in that the virtual vehicle is set according to a communication region while an inter-vehicle communication. Hereinafter, such a difference is mainly described.

Figure 26:
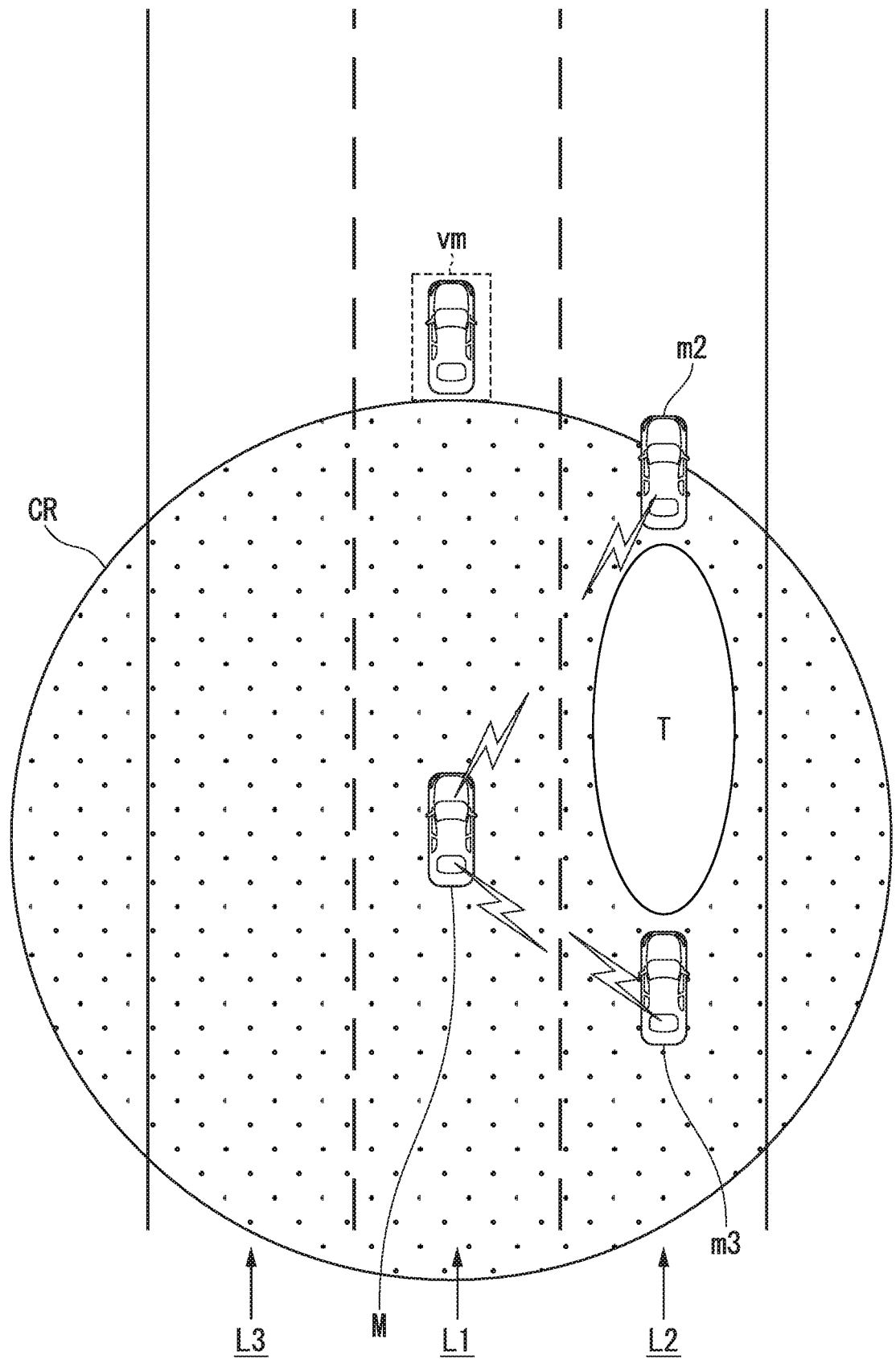
FIG. 26 is a view showing a state in which the vehicle is performing an inter-vehicle communication while traveling.

FIG. 26 is a view showing a state in which the vehicle M is performing an inter-vehicle communication while traveling. "CR" indicated in the drawing represents a communication region while an inter-vehicle communication. For example, the outside recognition unit 104 recognizes whether or not at least part of a frontward traveling vehicle, a lane-change target-position candidate frontward-traveling vehicle, and a lane-change target-position candidate rearward-traveling vehicle is present in the communication region CR according to information such as the position, the speed, and the like of the peripheral vehicle that is acquired by the communication unit 65. In the example of FIG. 26, an inter-vehicle communication between the communication unit 65 and a peripheral vehicle m2 that is traveling on the adjacent lane L2 is established, and an inter-vehicle communication between the communication unit 65 and a peripheral vehicle m3 that is traveling on the adjacent lane L2 is established. Accordingly, the outside recognition unit 104 recognizes that the peripheral vehicle m2 and the peripheral vehicle m3 are present in the communication region CR. In the example of FIG. 26, the position of the peripheral vehicle m2 is more frontward than the position of a lane change target position candidate T in the adjacent lane L2, and therefore, the outside recognition unit 104 recognizes the peripheral vehicle m2 as the lane-change target-position candidate frontward-traveling vehicle. The position of the peripheral vehicle m3 is more rearward than the position of the lane change target position candidate T in the adjacent lane L2, and therefore, the outside recognition unit 104 recognizes the peripheral vehicle m3 as the lane-change target-position candidate rearward-traveling vehicle. On the other hand, information regarding other peripheral vehicles that travel on the travel lane L1 is not acquired by the communication unit 65 (communication unestablished), the outside recognition unit 104 does not recognize the frontward traveling vehicle.

The determination part 112 determines whether or not a frontward traveling vehicle, a lane-change target-position candidate frontward-traveling vehicle, and a lane-change target-position candidate rearward-traveling vehicle are recognized by the outside recognition unit 104.

In the example of FIG. 26, the virtual vehicle setting part 113 sets a virtual vehicle which virtually simulates a frontward traveling vehicle that is not recognized by the outside recognition unit 104, in the vicinity of an outer edge of the communication region CR. The virtual vehicle setting part 113 sets the virtual vehicle vm as a movable body or a stationary body, similarly to the first to third embodiments described above. Thereby, it is possible for the another vehicle position change estimation part 114 to estimate a future position change, for example, with respect to any one or both of the recognized peripheral vehicle and the virtual vehicle that is set in the vicinity of the outer edge of the communication region CR.

According to the vehicle control apparatus 100, the vehicle control method, and the vehicle control program in the fourth embodiment described above, a virtual vehicle is set according to a communication region while an inter-vehicle communication, and thereby, it is possible to perform further flexible automated driving, similarly to the first and third embodiments.

Although embodiments of the invention have been described with reference to the drawings, the present invention is not limited to the embodiments, and a variety of changes and substitutions can be added without departing from the scope of the invention.

DESCRIPTION OF THE REFERENCE SYMBOLS

20: FINDER
30: RADAR
40: CAMERA
50: NAVIGATION DEVICE
60: VEHICLE SENSOR
65: COMMUNICATION UNIT
72: DRIVE FORCE OUTPUT DEVICE
74: STEERING DEVICE
76: BRAKE DEVICE
78: OPERATION DEVICE
80: OPERATION DETECTION SENSOR
82: SWITCH
100: VEHICLE CONTROL APPARATUS
102: VEHICLE POSITION RECOGNITION UNIT
104: OUTSIDE RECOGNITION UNIT
106: ACTION PLAN GENERATION UNIT
110: LANE CHANGE CONTROL UNIT
111: TARGET POSITION CANDIDATE SETTING PART
112: DETERMINATION PART
113: VIRTUAL VEHICLE SETTING PART
114: ANOTHER VEHICLE POSITION CHANGE ESTIMATION PART
115: TRAVEL TRAJECTORY GENERATION PART
116: TARGET POSITION DETERMINATION PART
120: TRAVEL CONTROL PART
122: CONTROL SWITCH UNIT
130: STORAGE UNIT
M: VEHICLE

What is claim is:

1. A vehicle control apparatus comprising:
a processor that executes executable components stored on a memory, the executable components comprising:
a first detection part configured to detect states of other vehicles that are traveling around a vehicle and exist in a predetermined detection region;
a control plan generation part configured to generate a control plan for the vehicle according to a result of determining whether the other vehicles are detected by the first detection part; and
a travel control part configured to read the control plan generated by the control plan generation part and to control acceleration, deceleration, or steering of the vehicle according to an event contained in the control plan,
wherein the control plan generation part is configured to generate the control plan of the vehicle according to one of the other vehicles that satisfies a predetermined condition among the other vehicles that are detected by the first detection part,
wherein the control plan generation part is configured to, in response to determining that the one of the other vehicles that satisfies the predetermined condition cannot be detected,
set a virtual vehicle that virtually simulates the one of the other vehicles that satisfies the predetermined condition and generate the control plan of the vehicle, and
set the virtual vehicle as a stationary body in an outer edge of the detection region of the first detection part, and
wherein while executing a lane change event from a present lane to an adjacent lane, the control plan generation part
sets lane change target position candidates between multiple other vehicles on the adjacent lane,
estimates, for each lane change target position candidate of the lane change target position candidates, future position changes of a first vehicle traveling in front of the lane change target position candidate, a second vehicle traveling behind the lane change target position candidate, and a third vehicle traveling in front of the vehicle in the present lane, and
determines a lane change target position from the lane change target position candidates based on estimations of the future position changes.

2. A vehicle control method, implemented by an in-vehicle computer, comprising:
detecting a state of other vehicles that are traveling around a vehicle and that exist in a predetermined detection region;
generating a control plan of the vehicle according to a determination of whether the other vehicles are detected;
controlling acceleration, deceleration, or steering of the vehicle according to an event contained in the control plan;
generating the control plan of the vehicle according to another vehicle, of the other vehicles, that satisfies a predetermined condition;
in response to determining that another vehicle that satisfies the predetermined condition cannot be detected:
setting a virtual vehicle which that virtually simulates the other vehicle that satisfies the predetermined condition and generating the control plan of the vehicle, and
setting the virtual vehicle as a stationary body in an outer edge of the detection region of the detecting; and
during execution of a lane change event from a present lane to an adjacent lane:
setting lane change target position candidates between multiple other vehicles on the adjacent lane;
estimating, for each lane change target position candidate of the lane change target position candidates, future position changes of a first vehicle traveling in front of the lane change target position candidate, a second vehicle traveling behind the lane change target position candidate, and a third vehicle traveling in front of the vehicle in the present lane; and
determining a lane change target position from the lane change target position candidates based on a result of the estimating.

3. A non-transitory computer-readable medium that causes an in-vehicle computer to:
- detect a state of other vehicles that are traveling around a vehicle and that exist in a predetermined detection region;
- generate a control plan of the vehicle according to a result of determining whether the other vehicles are detected;
- control acceleration, deceleration, or steering of the vehicle according to an event contained in the control plan;
- generate the control plan of the vehicle according to another vehicle, of the other vehicles, that satisfies a predetermined condition;
- in response to determining that the other vehicle that satisfies the predetermined condition cannot be detected:
  - set a virtual vehicle that virtually simulates the other vehicle that satisfies the predetermined condition and generate the control plan of the vehicle, and
  - set the virtual vehicle as a stationary body in an outer edge of the detection region; and
- during execution of a lane change event from a present lane to an adjacent lane:
  - set lane change target position candidates between multiple other vehicles on the adjacent lane;
  - estimate, for each lane change target position candidate of the lane change target position candidates, future position changes of a first vehicle traveling in front of the lane change target position candidate, a second vehicle traveling behind the lane change target position candidate, and a third vehicle traveling in front of the vehicle in the present lane; and
  - determine a lane change target position from the lane change target position candidates based on estimations of the future position changes.

* * * * *